(12) United States Patent
Nakadai et al.

(10) Patent No.: US 8,990,078 B2
(45) Date of Patent: Mar. 24, 2015

(54) INFORMATION PRESENTATION DEVICE ASSOCIATED WITH SOUND SOURCE SEPARATION

(71) Applicant: Honda Motor Co., Ltd., Tokyo (JP)

(72) Inventors: Kazuhiro Nakadai, Wako (JP); Keisuke Nakamura, Wako (JP); Michita Imai, Wako (JP); Shunsuke Ueda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 165 days.

(21) Appl. No.: 13/707,730

(22) Filed: Dec. 7, 2012

(65) Prior Publication Data
US 2013/0151249 A1 Jun. 13, 2013

(30) Foreign Application Priority Data
Dec. 12, 2011 (JP) .................................. 2011-271160

(51) Int. Cl.
*G08B 5/00* (2006.01)
*G10L 21/10* (2013.01)
*G10L 21/0364* (2013.01)
*G10L 15/22* (2006.01)
(Continued)

(52) U.S. Cl.
CPC . *G08B 5/00* (2013.01); *G10L 21/10* (2013.01); *G10L 21/0364* (2013.01); *G10L 2015/221* (2013.01); *G10L 15/26* (2013.01); *G10L 21/0272* (2013.01)
USPC ............................................ 704/231; 381/58

(58) Field of Classification Search
USPC ............................................ 704/231; 381/58
See application file for complete search history.

(56) References Cited

U.S. PATENT DOCUMENTS

| 7,526,361 | B2 * | 4/2009 | Nakadai et al. ............... 700/245 |
| 7,711,127 | B2 * | 5/2010 | Suzuki et al. ................... 381/92 |

(Continued)

FOREIGN PATENT DOCUMENTS

| JP | 61-146083 A | 7/1986 |
| JP | 05-028719 A | 2/1993 |

(Continued)

OTHER PUBLICATIONS

Japanese Office Action Notice of Reasons for Rejection application No. 2011-271160 dated Apr. 25, 2014.

(Continued)

*Primary Examiner* — Susan McFadden
(74) *Attorney, Agent, or Firm* — Squire Patton Boggs (US) LLP

(57) ABSTRACT

An information presentation device includes an audio signal input unit configured to input an audio signal, an image signal input unit configured to input an image signal, an image display unit configured to display an image indicated by the image signal, a sound source localization unit configured to estimate direction information for each sound source based on the audio signal, a sound source separation unit configured to separate the audio signal to sound-source-classified audio signals for each sound source, an operation input unit configured to receive an operation input and generates coordinate designation information indicating a part of a region of the image, and a sound source selection unit configured to select a sound-source-classified audio signal of a sound source associated with a coordinate which is included in a region indicated by the coordinate designation information, and which corresponds to the direction information.

11 Claims, 16 Drawing Sheets

(51) Int. Cl.
*G10L 15/26* (2006.01)
*G10L 21/0272* (2013.01)

(56) References Cited

U.S. PATENT DOCUMENTS

| | | | |
|---|---|---|---|
| 7,876,914 B2* | 1/2011 | Grosvenor et al. | 381/92 |
| 7,953,236 B2* | 5/2011 | Vronay | 381/310 |
| 8,155,331 B2* | 4/2012 | Nakadai et al. | 381/58 |
| 8,346,692 B2* | 1/2013 | Rouat et al. | 706/20 |

FOREIGN PATENT DOCUMENTS

| | | |
|---|---|---|
| JP | 08-037655 A | 2/1996 |
| JP | 2002-046088 A | 2/2002 |
| JP | 2002-264058 A | 9/2002 |
| JP | 2003-023612 A | 1/2003 |
| JP | 2003-189273 A | 7/2003 |
| JP | 2007-027990 A | 2/2007 |
| JP | 2007-319938 A | 12/2007 |
| JP | 2009-239348 A | 10/2009 |
| JP | 2009-282645 A | 12/2009 |
| JP | 2010-134507 A | 6/2010 |
| JP | 2010-162630 A | 7/2010 |

OTHER PUBLICATIONS

Office Action mailed Oct. 14, 2014, issued in corresponding JP Patent Application No. 2011-271160 (with English translation).

* cited by examiner

INFORMATION PRESENTATION DEVICE ASSOCIATED WITH SOUND SOURCE SEPARATION

CROSS-REFERENCE TO RELATED APPLICATIONS

Priority is claimed on Japanese Patent Application No. 2011-271160, filed Dec. 12, 2011, the contents of which are entirely incorporated herein by reference.

BACKGROUND OF THE INVENTION

1. Field of the Invention

The present invention relates to an information presentation device, an information presentation method, an information presentation system, and an information transmission system.

2. Description of Related Art

In the related art, a technique of presenting environmental information recorded in a remote place to a user and notifying the user of the recorded environment of the place has been proposed. For example, there has been a terminal device which receives audio information or image information recorded by an imaging device or a sound pick-up device which is equipped on a robot and which presents the received information to a user. It is a system of using such a terminal device to help a user to understand the environmental information of the vicinity of the robot and for a user to operate the robot.

For example, a robot device disclosed in Japanese Unexamined Patent Application, First Publication No. 2002-46088 is configured of a robot main body including a camera, a stereo microphone, a display which displays expressions, a speaker, a CPU main body, a communication unit, a telescopic mechanism, and a travel device, and an operating terminal including a stereo headphone with a microphone provided with a display, a head operating portion, a telescopic operation unit, an audio adjusting portion, a communication unit, and an imaging portion. Accordingly, the robot device realizes a meeting with a sense of presence by seeing and listening to situations of a meeting, showing expressions, presenting documents, shaking hands, and the like, through a robot attending a remote conference hall by an operator.

SUMMARY OF THE INVENTION

However, when a plurality of sound sources are present in the vicinity of the robot device, the stereo microphone records audio information in which audio signals of each sound source are superimposed over each other. A user hears the superimposed audio information using a stereo headphone with a microphone. Thus, it has been difficult for a user to distinguish content indicated by audio information for each of the sound sources and to understand the utterance content.

The present invention has been made to address the aforementioned problems and provide an information presentation device, an information presentation method, an information presentation program, and an information transmission system which helps a user easily understand the utterance content.

(1) According to an aspect of the present invention, there is provided an information presentation device including: an audio signal input unit configured to input an audio signal; an image signal input unit configured to input an image signal; an image display unit configured to display an image indicated by the image signal; a sound source localization unit configured to estimate direction information for each sound source based on the audio signal; a sound source separation unit configured to separate the audio signal into sound-source-classified audio signals for each sound source; an operation input unit configured to receive an operation input and generates coordinate designation information indicating a part of a region of the image; and a sound source selection unit configured to select a sound source associated with a coordinate which is included in a region indicated by the coordinate designation information, and which corresponds to the direction information.

(2) According to another aspect of the present invention, the information presentation device according to the above configuration of (1) may further include: a speech detection unit configured to detect whether or not the sound sources corresponding to the sound-source-classified audio signals are in an utterance state; and a display information generation unit configured to generate display information indicating an utterance state at a coordinate corresponding to the direction information of the sound sources in which the utterance state is detected, and an image indicated by the display information may be displayed to be superimposed over the image.

(3) According to another aspect of the present invention, the information presentation device according to the above configuration of (1) may further include: a speech recognition unit configured to recognize an utterance content based on the sound-source-classified audio signals; and a display information generation unit configured to generate display information indicating the utterance content at a coordinate corresponding to the direction information of the sound sources corresponding to the sound-source-classified audio signal, and an image indicated by the display information may be displayed to be superimposed over the image.

(4) According to another aspect of the present invention, there is provided an information presentation device, including: an image signal input unit configured to input an image signal; a direction information input unit configured to input direction information for each sound source; a sound-source-classified audio signal input unit configured to receive a sound-source-classified audio signal for each sound source; an operation input unit configured to receive an operation input and generates coordinate designation information indicating a part of a region of the image; and a sound source selection unit configured to select sound-source-classified audio signal of a sound source associated with a coordinate which is included in a region indicated by the coordinate designation information, and which corresponds to the direction information.

(5) According to another aspect of the present invention, there is provided an information transmission system including: an information acquisition device; and an information presentation device, in which the information presentation device includes, an audio signal input unit configured to input an audio signal, an image signal input unit configured to input an image signal, an image display unit configured to display an image indicated by the image signal, a sound source localization unit configured to estimate direction information for each sound source based on the audio signal, a sound source separation unit configured to separate the audio signal to sound-source-classified audio signals for each sound source, an operation input unit configured to receive an operation input and generates coordinate designation information indicating a part of a region of the image, and a sound source selection unit configured to select a sound source associated with a coordinate which is included in a region indicated by the coordinate designation information, and which corresponds to the direction information.

(6) According to another aspect of the present invention, in the information transmission system according to the above configuration of (5), the information acquisition device may be included in a robot, and may include: an imaging unit configured to acquire an image signal of the captured image; a position information acquisition unit configured to acquire position information of the imaging unit; and an image correction unit configured to correct the acquired image signal based on the position information, and the information acquisition device may output the image signal to the image signal input unit.

(7) According to another aspect of the present invention, in the information transmission system according to the above configuration of (5), the information presentation device may include a display information generation unit configured to generate, when a coordinate, according to the direction information of the sound source corresponding to the sound-source-classified audio signal, are beyond the display range of the image indicated by the input image signal, display information indicating that the coordinate are beyond the display range, and a control information generation unit configured to generate control information which designates a conversion of an aiming of an imaging unit configured to capture an image indicated by the input image signal, into a direction of the sound source corresponding to the sound-source classified audio signal, the information acquisition device be included in a robot, and include the imaging unit, and a motion control unit configured to control the aiming of the imaging unit based on the control information, and the information acquisition device output the image signal to the audio signal input unit.

(8) According to another aspect of the present invention, there is provided an information presentation method of an information presentation device including: a step of inputting an audio signal by the information presentation device; a step of inputting an image signal by the information presentation device; a step of displaying an image indicated by the image signal by the information presentation device; a step of estimating direction information for each sound source based on the audio signal by the information presentation device; a step of separating the audio signal to sound-source-classified audio signals for respective sound sources by the information presentation device; a step of receiving an operation input and generating coordinate designation information indicating a part of a region of the image by the information presentation device; and a step of selecting sound-source-classified audio signals of sound sources according to a coordinate included in a region indicated by the coordinate designation information, that is, a coordinate corresponding to the direction information, by the information presentation device.

(9) According to another aspect of the present invention, there is provided an information presentation method of an information presentation device including: a step of inputting an image signal by the information presentation device; a step of inputting direction information for each sound source by the information presentation device; a step of receiving sound-source-classified audio signal for each sound source by the information presentation device; a step of receiving an operation input and generating coordinate designation information indicating a part of a region of the image by the information presentation device; and a step of selecting sound-source-classified audio signals of sound sources according to a coordinate included in a region indicated by the coordinate designation information, that is, a coordinate corresponding to the direction information, by the information presentation device.

(10) According to another aspect of the present invention, there is provided an information presentation program which causes a computer of an information presentation device to execute: a procedure of inputting an audio signal; a process of inputting an image signal a process of displaying an image indicated by the image signal; a procedure of estimating direction information for each sound source based on the audio signal; a procedure of separating the audio signal into sound-source-classified audio signals for respective sound sources; a procedure of receiving an operation input and generating coordinate designation information indicating a part of a region of the image; and a procedure of selecting sound-source-classified audio signals of sound sources according to a coordinate included in a region indicated by the coordinate designation information, that is, a coordinate corresponding to the direction information.

(11) According to another aspect of the present invention, there is provided an information presentation program which causes a computer of an information presentation device to execute: a procedure of inputting an image signal; a procedure of inputting direction information for each sound source; a procedure of receiving sound-source-classified audio signal for each sound source; a procedure of receiving an operation input and generating coordinate designation information indicating a part of a region of the image; and a procedure of selecting sound-source-classified audio signals of sound sources according to a coordinate included in a region indicated by the coordinate designation information, that is, a coordinate corresponding to the direction information.

According to the configurations of (1), (4), (5), and (8) to (11) described above, it is easy to understand the utterance content.

According to the configuration of (2) described above, it is easy to select the sound source which is in the utterance state.

According to the configuration of (3) described above, it is possible for a user to understand the utterance content through the eye.

According to the configuration of (6) described above, the degradation of the displayed image quality is reduced.

According to the configuration of (7) described above, it is possible for a user to understand the image in the direction of the sound source which is not displayed on the screen through the eye.

DETAILED DESCRIPTION OF THE INVENTION

First Embodiment

Figure 1:
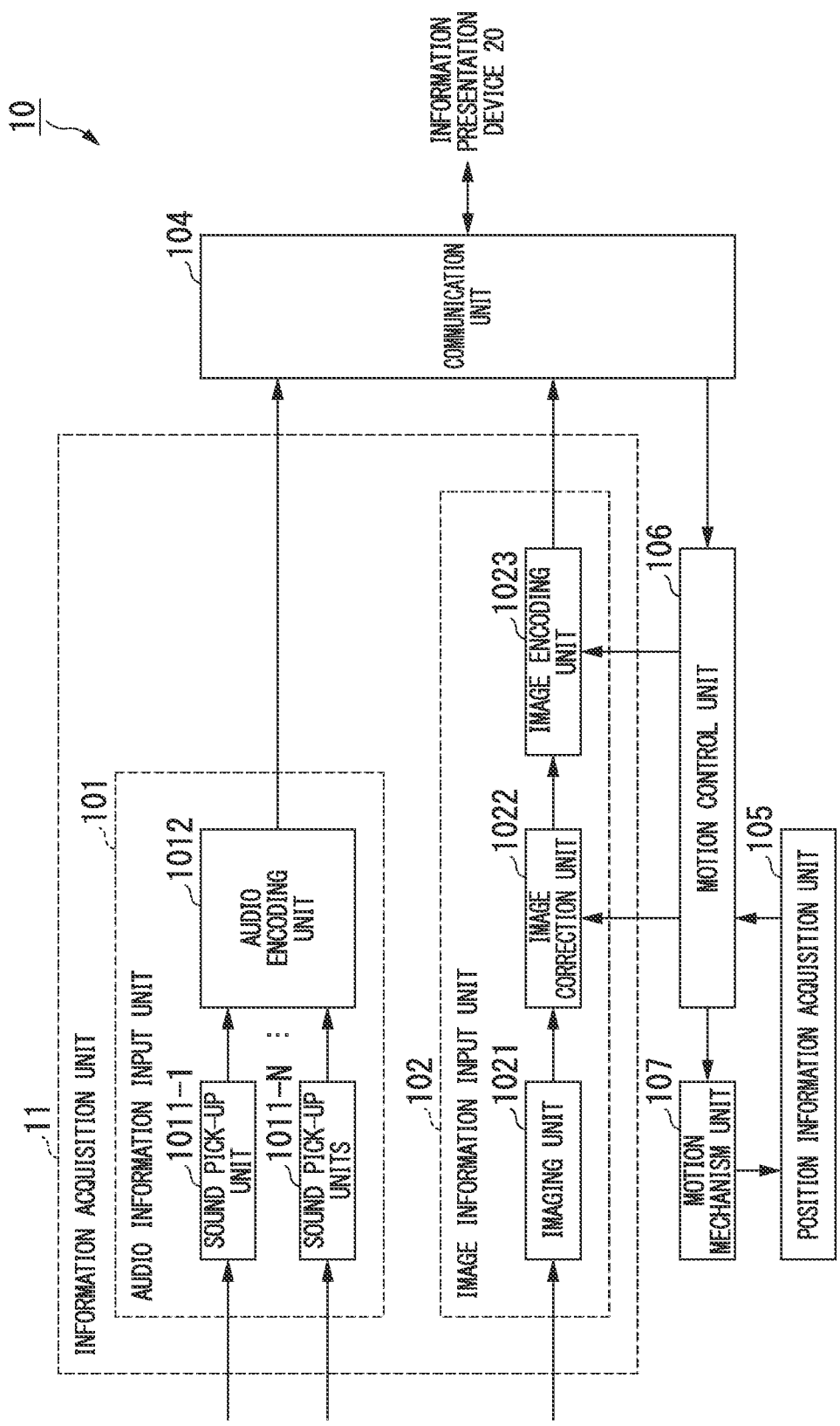
FIG. 1 is a schematic view showing a configuration of a robot according to a first embodiment of the present invention.

Hereinafter, embodiments of the present invention will be described with reference to the drawings.

An information transmission system 1 includes a robot 10, an information presentation device 20, and a network 30.

The robot 10 is a robot which changes its position and posture, that is, a humanoid robot which rotates a head portion in a horizontal direction and walks on two legs, for example. In addition, the robot 10 is not limited to a humanoid robot which walks on two legs, and may be a wheeled robot which includes rotating wheels and moves autonomously, or a human-carrying robot in which a person rides to support the movement.

The robot 10 includes an information acquisition unit 11. The information acquisition unit 11 acquires audio information and image information indicating an environment of the vicinity thereof, and transmits the acquired audio information and image information to an information presentation device 20. The robot 10 controls the motion based on the control information received from the information presentation device 20.

The information presentation device 20 receives audio information and image information from the robot 10. The information presentation device 20 separates the received audio information into audio signals for each sound source, and estimates direction information for each sound source. The information presentation device 20 reproduces audio based on the separated audio signals. The information presentation device 20 displays an image based on the received image information.

The information presentation device 20 detects an operation input by a user and generates control information according to the motion of the robot 10. The generated control information is transmitted to the robot 10.

The network 30 is a network which performs transmission and reception of signals between the robot 10 and the information presentation device 20. The network 30 may be any one of the local area network (LAN), the wide area network (WAN), and the Internet, and it is not limited thereto. In addition, a transmission medium configuring the network 30 may be wired or a wireless.

Next, a configuration of the robot 10 will be described.

FIG. 1 is a schematic view showing a configuration of the robot 10 according to the embodiment.

The robot 10 includes the information acquisition unit 11, a communication unit 104, a position information acquisition unit 105, a motion control unit 106, and a motion mechanism unit 107.

The information acquisition unit 11 includes an audio information input unit 101 and an image information input unit 102.

The audio information input unit 101 includes N sound pick-up units 1011-1 to 1011-N (N is 2 or an integer bigger than 2, for example 8) and an audio encoding unit 1012.

The sound pick-up units 1011-1 to 1011-N are electro-acoustic transducers, for example microphones which convert each sound wave which is a vibration in the air into electric signals. The sound pick-up units 1011-1 to 1011-N output each converted electric signal to the audio encoding unit 1012 as an analog audio signal for each channel.

The audio encoding unit 1012 receives the analog audio signal for each channel from the sound pick-up units 1011-1 to 1011-N. The audio encoding unit 1012 performs A/D conversion (Analog-to-Digital Transform) for each input analog audio signal, to generate a digital audio signal for each channel. The audio encoding unit 1012 encodes the generated digital audio signal using a predetermined encoding method (for example, ITU-T recommendation G. 722) and generates an audio code for each channel. The audio encoding unit 1012 multiplexes the generated audio code for each channel to generate one item of audio information with respect to the all channels. The audio encoding unit 1012 outputs the generated audio information to the communication unit 104 as a transmission signal.

The image information input unit 102 includes an imaging unit 1021, an image correction unit 1022 and an image encoding unit 1023.

The imaging unit 1021 captures an image showing an object and generates an image signal indicating the captured image. For example, the imaging unit 1021 is a CCD (Charge Coupled Device) camera, or a CMOS (Complementary Metal Oxide Semiconductor) camera. For example, the imaging unit 1021 is disposed on the front of a head portion of the robot 10. The image signal generated by the imaging unit 1021 includes a signal value for each of a predetermined numbers of pixels disposed on the plane surface. The image signal is an image signal based on the RGB color model which includes three color (red (R), green (G), and blue (B)) signal values for each pixel, for example. The imaging unit 1021 outputs the generated image signal to the image correction unit 1022.

The image correction unit 1022 corrects the image signal input from the imaging unit 1021 based on an image correction signal input from the motion control unit 106. For example, the image correction signal is a signal indicating an indication to reduce degradation (for example, blurring) of the image quality generated due to rapid changing of the position or the aiming of the imaging unit 1021.

The image correction unit 1022 moves a coordinate of a signal value included in the converted image signal for an amount of coordinate correction indicated by the image correction signal to correct the image so as to compensate for or to reduce the movement, and generates the corrected image signal.

Herein, before correcting the image signal, the image correction unit 1022 may interpolate the signal value included in the input image signal between the pixels and convert it into an image signal with higher resolution (oversampling). In this case, the image correction unit 1022 outputs the image signal in which the resolution of the corrected image signal is reduced to the same resolution with the input image signal. Accordingly, it is possible to improve the accuracy of the correction.

In addition, the image correction unit 1022 may correct the image signal by driving an imaging element included in the imaging unit 1021 so as to compensate for or to reduce the movement of the image based on the image correction signal.

In a case where the image correction signal is not input, the image correction unit 1022 may output the input image signal to the image encoding unit 1023 without correction.

The image encoding unit 1023 encodes the image signal input from the image correction unit 1022 using a predetermined encoding method (for example, ITU-T recommendation H. 264) for each frame, and generates an image code. The image encoding unit 1023 outputs the generated image code to the communication unit 104 as a transmission signal.

In addition, in a case where the encoding method is used with a variable bit rate, the image encoding unit 1023 changes the bit rate for encoding to a bit rate indicated by a rate correction signal input from the motion control unit 106. Herein, the rate correction signal is a signal indicating an indication to change the bit rate of the encoded image code. The bit rate of the image is determined by a frame rate which is the numbers of frames for one second and the resolution which is the numbers of pixels for one frame. For example, in the encoding method with H. 264, it is specified to use one of the 15 combinations (levels) of frame rates and the resolutions. In the encoding method, the height of the bit rate is determined by the size of the level number. The rate correction signal may be a signal indicating the frame rate, the resolution, or the combination thereof which is determined in the encoding method. In a case where the rate correction signal is not input, the image encoding unit 1023 performs the image encoding with the predetermined bit rate or the bit rate which is set immediately before the image encoding.

The communication unit 104 converts the transmission signal input from the audio encoding unit 1012 or the image encoding unit 1023 into a predetermined message format, and transmits the converted transmission signal to the information presentation device 20. For example, the message format to be converted is a format used with a ROS (Robot Operating System) which is one of operating systems for operating the robot. The communication unit 104 extracts a control signal from the signal received from the information presentation device 20 and outputs the extracted control signal to the motion control unit 106. The communication unit 104 is a communication interface, for example.

The position information acquisition unit 105 includes a position sensor which detects displacement of the motion mechanism unit 107, and generates position information with a predetermined time interval (for example 20 ms) based on the detected displacement. The position information indicates the position and posture of the robot 10 which are the directions of the head portion, for example.

The position information acquisition unit 105 outputs the generated position information to the motion control unit 106.

The motion control unit 106 includes a memory unit which stores power model information which corresponds to time series pattern information of a power value and the control information. The time series pattern information of the power value is a power value for each component configuring the motion mechanism unit 107, and information indicating a time series pattern of a power value according to the position information. The control information associated with the power model information includes, for example, information which commands changes to the posture and position of the robot 10. The component corresponded with the control information thereof is, for example, a motor which rotates the head portion.

The motion control unit 106 reads out the power model information corresponding to the control information input from the communication unit 104 from the memory unit. The motion control unit 106 determines the power value for each component corresponding to the position information input from the position information acquisition unit 105, by referring to the read-out power model information. The motion control unit 106 outputs the power having the predetermined power value to the corresponding component of the motion mechanism unit 107.

The motion control unit 106 calculates the displacement from the currently input position information (for example, direction of the head portion), and the position information previously input for the predetermined time, and generates the image correction signal or the rate correction signal, in a case where the calculated displacement exceeds a predetermined threshold value. Herein, the motion control unit 106 calculates a movement speed for each pixel from the displacement thereof and calculates a movement amount of the image for each pixel based on the calculated movement speed. The movement amount is the amount of movement of the image on the screen within the time for which one signal value is subjected to the sampling by the imaging unit 1021, and is indicated by two dimensional vectors including a horizontal (X) component and a vertical (Y) component. The motion control unit 106 sets the value which is obtained by changing positive and negative values of the calculated movement amount as an amount of coordinate correction, and generates the image correction signal indicating the amount of the coordinate correction.

The motion control unit 106 generates a rate correction signal which indicates levels of the bit rates according to the encoding method used by the image encoding unit 1023 and which indicates lower bit rates (frame rates and resolution) as the calculated displacement is large.

The motion control unit 106 outputs the generated image correction signal to the image correction unit 1022, and outputs the rate correction signal to the image encoding unit 1023.

The motion mechanism unit 107 is configured of a plurality of components (for example, the motor which rotates the head portion of the robot 10 and the like). Each component is driven by the power supplied from the motion control unit 106. The component to which the power is not supplied stops the motion.

Next, an example of the disposition of the imaging unit 1021 and the sound pick-up units 1011-1 to 1011-N will be described.

Figure 2:
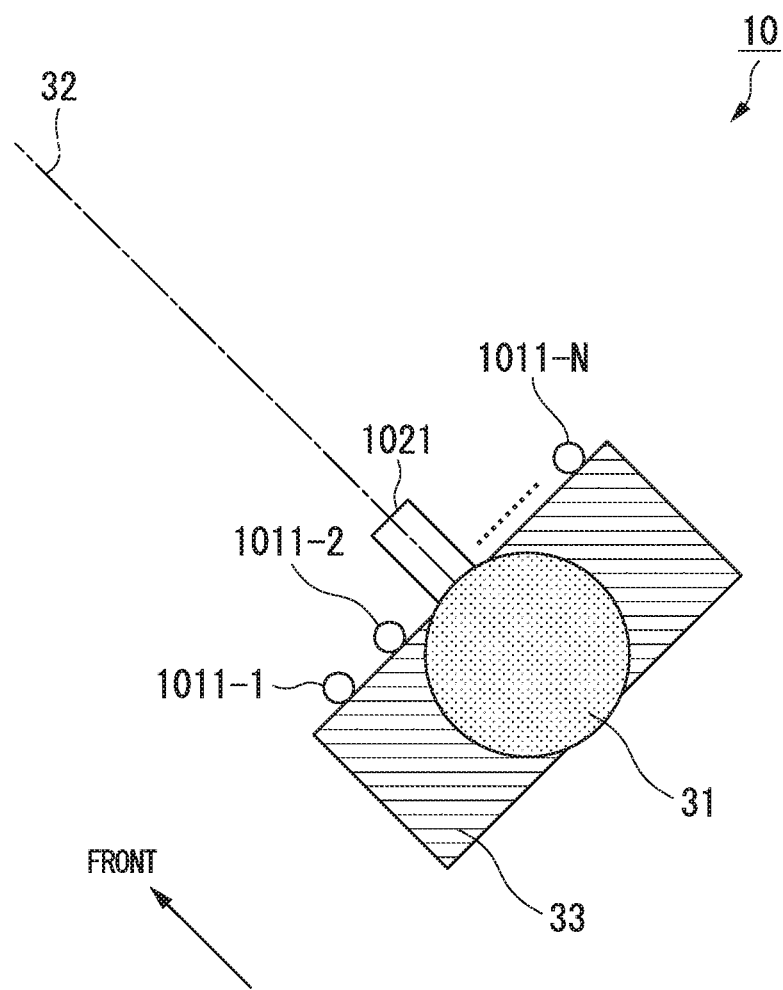
FIG. 2 is a plan view showing an example of disposition of an imaging unit and a sound pick-up unit according to the embodiment.

FIG. 2 is a plan view showing an example of the disposition of the imaging unit 1021 and the sound pick-up units 1011-1 to 1011-N according to the embodiment.

FIG. 2 shows the robot 10 in the center. The filled circle which is positioned on the center of the robot 10 indicates a head portion 31 of the robot 10. The upper left direction in FIG. 2 is a front direction of the robot 10. A dashed-dotted line which extends from the head portion 31 of the robot 10 in the front direction indicates a direction of an optical axis 32 of the imaging unit 1021. FIG. 2 shows that the imaging unit 1021 is disposed so that the optical axis 32 faces the front of the head portion 31 of the robot 10.

A rectangle filled by horizontal stripes indicates a body portion 33 of the robot 10. The drawing shows that the sound pick-up units 1011-1 to 1011-N are disposed in the horizontal direction at regular intervals on the front of the body portion of the robot 10. Each direction of the sound pick-up units 1011-1 to 1011-N is the front direction of the robot 10.

Next, a configuration of the information presentation device 20 will be described.

Figure 3:
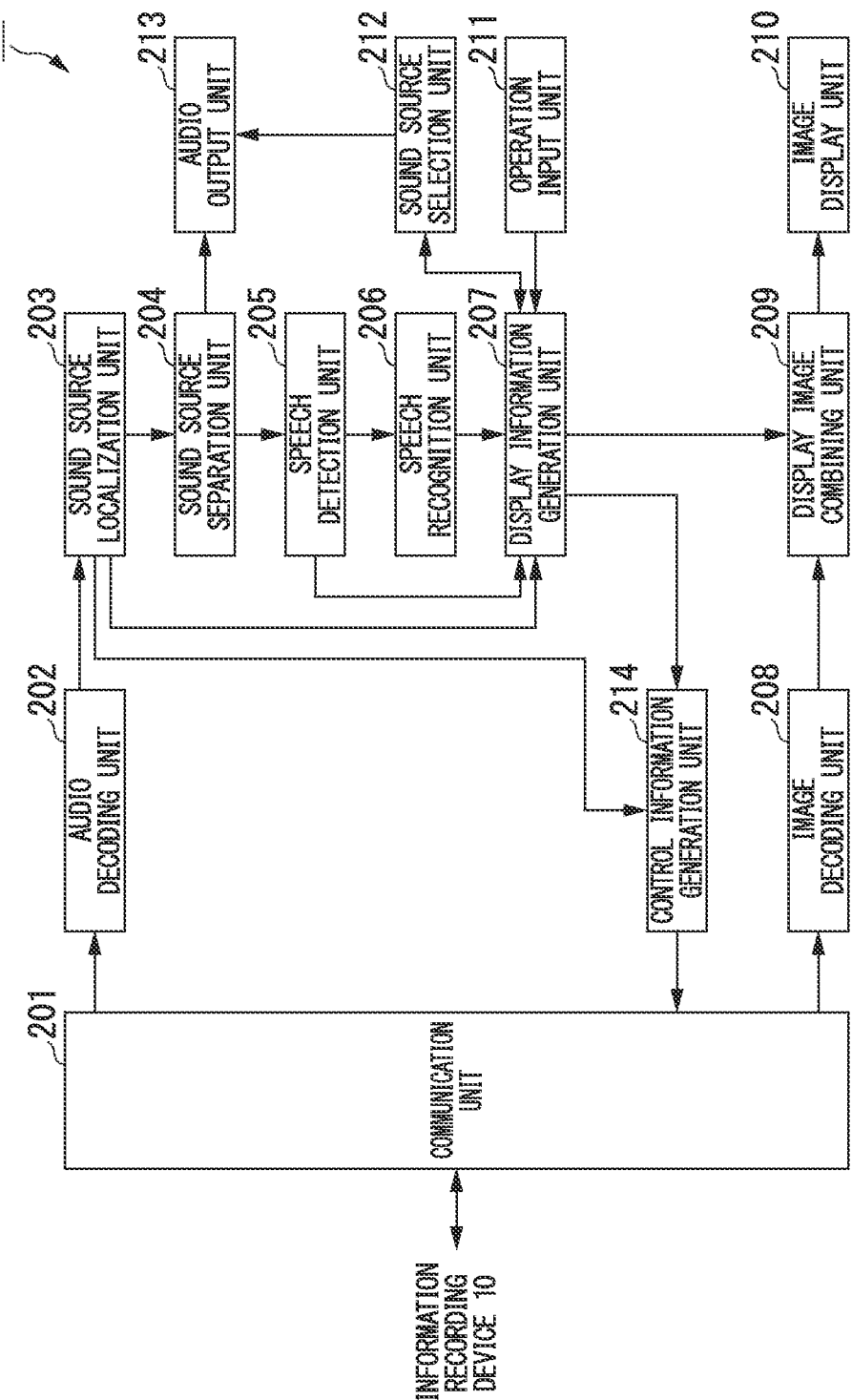
FIG. 3 is a schematic view showing a configuration of an information presentation device according to the embodiment.

FIG. 3 is a schematic view showing a configuration of the information presentation device according to the embodiment.

The information presentation device 20 includes a communication unit 201, an audio decoding unit 202, a sound source localization unit 203, a sound source separation unit 204, a speech detection unit 205, a speech recognition unit 206, a display information generation unit 207, an image decoding unit 208, a display image combining unit 209, an image display unit 210, an operation input unit 211, a sound source selection unit 212, an audio output unit 213, and a control information generation unit 214.

The communication unit 201 extracts the audio information and the image code from the signals received from the robot 10 (FIG. 2). The communication unit 201 outputs the extracted audio information to the audio decoding unit 202 and outputs the image code to the image decoding unit 208. The communication unit 201 converts the control information input from the control information generation unit 214 in the message format described above, and transmits the information to the robot 10. The communication unit 201 is a communication interface, for example.

The audio decoding unit 202 separates the audio information input from the communication unit 201 into the audio code for each channel. The audio decoding unit 202 decodes the separated audio code to generate the audio signal for each channel. The decoding method used by the audio decoding unit 202 is a decoding method corresponding to the audio encoding method used by the audio encoding unit 1012 of the robot 10. The audio decoding unit 202 outputs the generated audio signal for each channel to the sound source localization unit 203. Herein, the numbers of channels of the audio signal which is output by the audio decoding unit 202 is N (N is the integer bigger than 1).

The sound source localization unit 203 estimates a direction for each sound source, based on the audio signal for each channel input from the audio decoding unit 202. In order to estimate the direction of the sound source, the sound source localization unit 203 may use the MUSIC (Multiple Signal Classification) method. A sound source direction estimating process using the MUSIC method will be described later. In the embodiment, instead of the normal MUSIC method, the sound source localization unit 203 may use a method such as the GEVD (Generalized EigenValue Decomposition)-MUSIC method or the GSVD (Generalized Singular Value Decomposition)-MUSIC method, for example.

The sound source localization unit 203 outputs the sound source direction information indicating the estimated direction for each sound source to the sound source separation unit 204, the display information generation unit 207, and the control information generation unit 214. The sound source localization unit 203 outputs the audio signal for each channel input from the audio decoding unit 202 to the sound source separation unit 204.

The sound source separation unit 204 receives the sound source direction information and the audio signal for each channel from the sound source localization unit 203. The sound source separation unit 204 separates the audio signal into the audio signal for each sound source, based on the input sound source direction information. In order to separate the audio signal, the sound source separation unit 204 may use the GHDSS (Geometric-constrained High-order Dicorrelation-based Source Separation) method, for example. A process according to the sound source separation using the GHDSS method will be described later.

The sound source separation unit 204 outputs the separated audio signal to the speech detection unit 205 and the audio output unit 213 as the sound source-classified audio signal.

The speech detection unit 205 performs Voice Activity Detection (VAD) with respect to the sound source-classified audio signal input from the sound source separation unit 204. When the power value for each predetermined time interval (for example, 10 ms) exceeds the predetermined power threshold value and the numbers of zero crossings for each time interval at that time exceeds the predetermined number, the speech detection unit 205 detects it as a speech section. The number of zero crossings is the number of times of an amplitude value of the audio signal crossing zero, that is, the number of times of changing from the negative value to the positive value, or from the positive value to the negative value. The speech detection unit 205 generates speech detection information indicating whether or not it is the speech section for each time interval thereof. The speech detection unit 205 outputs the input sound source-classified audio signal and the speech detection information corresponding to the signal thereof to the speech recognition unit 206. The speech detection unit 205 outputs the speech detection information to the display information generation unit 207.

The speech recognition unit 206 receives the sound source-classified audio signal and the speech detection information corresponding thereto from the speech detection unit 205. The speech recognition unit 206 performs a speech recognizing process for a section which is indicated as the speech section by the speech detection information from the input sound source-classified audio signal, and generates text information for each sound source.

For example, the speech recognition unit 206 calculates an amount of acoustic features based on the sound source-classified audio signal, and determines candidates from vocal sound information corresponding to the amount of acoustic features calculated using the acoustic model. The speech recognition unit 206 may use Mel-scale cepstrum, for example, as the amount of acoustic features. The speech recognition unit 206 determines candidates from vocabulary information corresponding to the candidates of the determined vocal sound information using the language model. The speech recognition unit 206 determines text information indicating the vocabulary information which has the greatest likelihood from the candidates of the determined vocabulary information. The speech recognition unit 206 may use the Hidden Markov Model (HMM), for example, as the acoustic model or the language model.

The speech recognition unit 206 outputs the generated text information for each sound source to the display information generation unit 207.

The display information generation unit 207 converts the direction for each sound source indicated by the sound source direction information input from the sound source localization unit 203 into a display coordinate indicated by the image coordinate system. The image coordinate system is a coordinate system showing the image displayed on the imaging element (imaging surface) which is orthogonal to the optical axis passing the focal point of the imaging unit 1021 of the robot 10.

Herein, the image coordinate system will be described.

Figure 4:
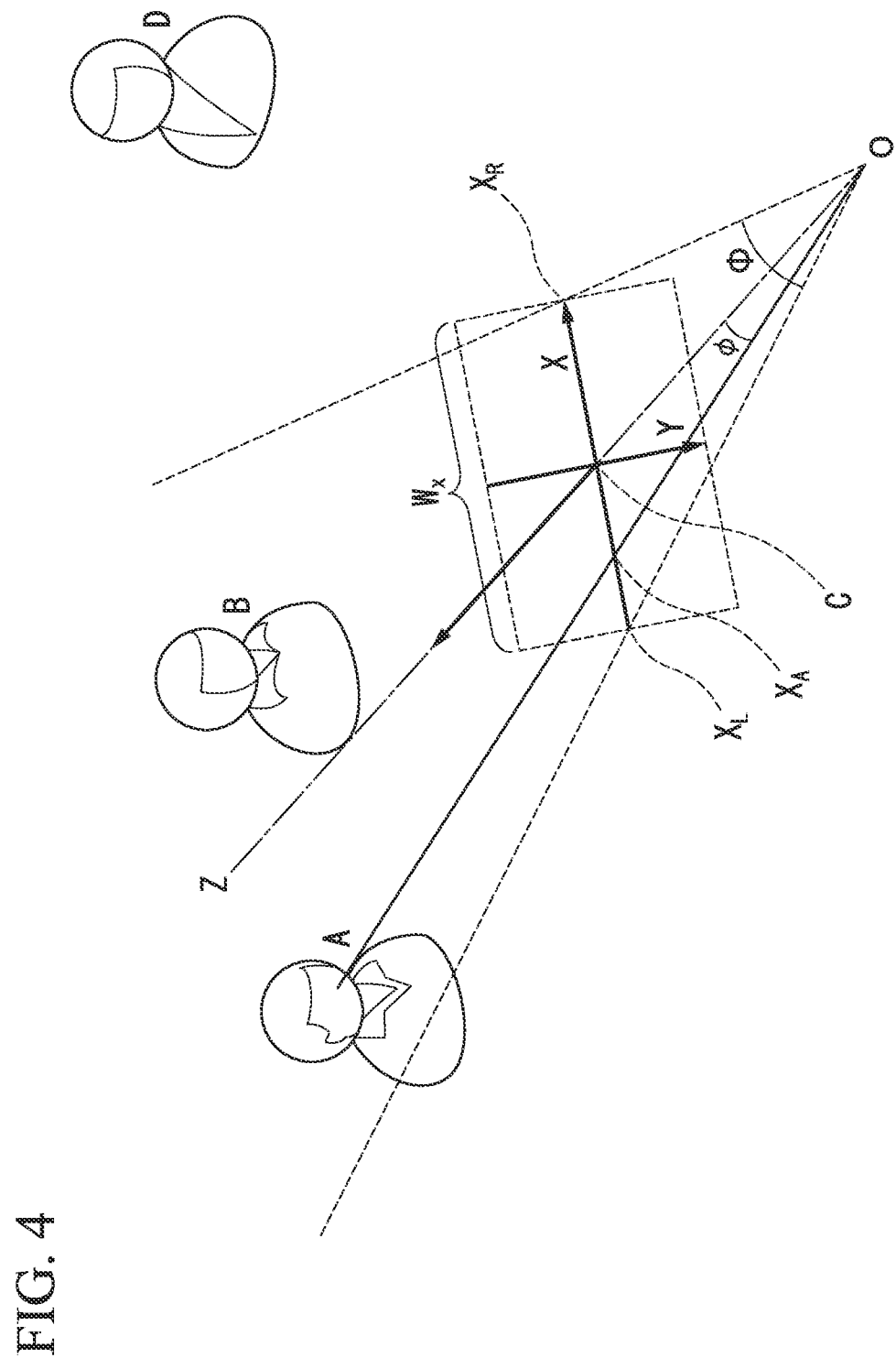
FIG. 4 is a conceptual view showing an example of an image coordinate system.

FIG. 4 is a conceptual view showing an example of the image coordinate system.

A point O displayed on the lower right of FIG. 4 is the focal point. A dashed-dotted line to the upper left from the focal point O indicates the optical axis of the imaging unit 1021, that is, a Z axis. A rectangle indicated by a dashed line intersecting the Z axis and a center point C indicates the imaging surface. The imaging surface is orthogonal to the Z axis. A solid line to the right from the point C indicates an X axis towards the horizontal direction of the imaging surface and a solid line to the lower right from the point C indicates a Y axis towards the vertical direction of the imaging surface. In addition, in FIG. 4, the left end and the right end of the imaging surface on the X axis are referred to as $X_L$ and $X_R$, respectively.

Herein, an angle formed by a line segment connecting the left end $X_L$ and the focal point O, and a line segment connecting the right end $X_R$ and the focal point O is a viewing angle (also referred to as a filed angle) $\Phi$. That is, the image of an object in a direction $\phi$ in a range of the viewing angle $\Phi$ of the imaging unit 1021 is captured. For example, in FIG. 4, since a direction of a person A and a direction of a person B are in the range of the viewing angle $\Phi$, the image thereof is captured. Since a person D is out of the range of the viewing angle $\Phi$, the image thereof is not captured. If the persons A, B, and D are speaking, they become sound sources.

The display information generation unit 207 calculates a coordinate value X of a display coordinate corresponding to the sound source direction $\phi$ in the X axis direction, using Equation (1), for example.

Equation 1

$$X = \frac{\frac{W_x}{2}\tan\phi}{\tan\frac{\Phi}{2}} - \frac{W_x}{2} \tag{1}$$

In Equation (1), $W_x$ indicates a width of an image in the horizontal direction. When a frame size of the image information of one frame is 640 pixels in the horizontal direction and 480 pixels in the vertical direction, for example, $W_x$ is 640.

The display information generation unit 207 determines a predetermined coordinate value as a Y axis component of the display coordinate, for example O (center of the vertical direction).

Returning to FIG. 3, the display information generation unit 207 includes a memory unit (not shown) in which the patterned image information is stored in advance. The patterned image information is information indicating the image which is stylized in advance. The patterned image information is for example, utterance patterned image information which indicates the utterance state, playback patterned image information which indicates the utterance state and audio playback, text patterned image information (balloon) which indicates a region displaying a text indicating the utterance content, elliptical patterned image information (ellipse), curve patterned image information (curve), or indication patterned image information (arrow). A displaying form of the image indicated by the utterance patterned image information and a displaying form of the image indicated by the playback patterned image information are different from each other. Herein, the displaying form is a color, brightness, a shape, pattern or the like, for example. The example of the display information including the patterned image information will be described later.

When the speech detection information input from the speech detection unit 205 indicates the speech section, the display information generation unit 207 reads out the utterance patterned image information from the memory unit. The display information generation unit 207 generates display information in which the image indicated by the read utterance patterned image information indicates the image included in the display coordinate. The display information generation unit 207 may include a text (for example, "please select the sound you want to hear") prompting a user to select the sound source in the display information.

However, when the sound source direction $\phi$ indicated by the sound source direction information is out of the range of the viewing angle $\Phi$, the display information generation unit 207 generates display information indicating the image which is acquired by disposing the image indicated by the read utterance patterned image information on the predetermined display coordinate. This display coordinate may be a position as the upper end or the lower end of the screen so as not to disturb the viewing, for example. Hereinafter, the display coordinate is called a sound source display coordinate outside the range. The display information generation unit 207 may include a text (for example, "there is a sound source outside the range") indicating a user the sound source outside the range of the viewing angle in the display information. The display information generation unit 207 outputs the generated display information to the display image combining unit 209.

When the coordinate designation information input from the operation input unit 211 indicates an elliptical region, the display information generation unit 207 reads out the elliptical patterned image information from the memory unit. The display information generation unit 207 generates display information indicating the image acquired by disposing read elliptical patterned image information on a region indicated by the coordinate designation information. The display information generation unit 207 outputs the generated display information to the display image combining unit 209, the sound source selection unit 212, and the control information generation unit 214. An example of the display image including the elliptical patterned image will be described later.

When the coordinate designation information input from the operation input unit 211 indicates an orbit indicated by the curve, the display information generation unit 207 reads out the curve patterned image information from the memory unit. The display information generation unit 207 generates display information indicating the image which is acquired by disposing the image indicated by the read curve patterned image information on the region indicated by the coordinate designation information. The display information generation unit 207 outputs the generated display information to the display image combining unit 209, the sound source selection unit 212, and the control information generation unit 214. An example of the displayed image including the curve patterned image will be described later.

When the coordinate designation information input from the operation input unit 211 indicates one coordinate, the display information generation unit 207 reads out the indication patterned image information from the memory unit. The display information generation unit 207 generates display information indicating the image acquired by disposing the image indicated by the read indication patterned image information on the region indicated by the coordinate designation information. The display information generation unit 207 outputs the generated display information to the display image combining unit 209, the sound source selection unit 212, and the control information generation unit 214. An example of the displayed image including the indication patterned image will be described later.

When selected sound source information is input from the sound source selection unit 212, the display information generation unit 207 reads out playback patterned image information from the memory unit. The display information generation unit 207 switches the utterance patterned image information corresponding to the sound source indicated by the selection sound source information in the generated display information to the read playback patterned image information. The display information generation unit 207 outputs the display information, which is updated by switching to the playback patterned image information, to the display image combining unit 209. An example of the displayed image including the playback patterned image will be described later.

When the text information is input from the speech recognition unit 206, the display information generation unit 207 reads out the text patterned image information from the memory unit. Instead of the playback patterned image information or the utterance patterned image information, the display information generation unit 207 may generate the display information in which the image indicated by the text patterned image information indicates the image disposed on the display coordinate of the corresponding sound source. An example of the displayed image including the text patterned image will be described later.

Herein, the display information generation unit 207 includes the image showing the input text in the display region of the image indicated by the text patterned image information. However, the display information generation unit 207 updates the display information so as that the number of letters of the text included in the display region of the image indicated by the text patterned image information becomes smaller than the preset number (for example, 30 letters in Japanese). Accordingly, displaying an excessive number of letters of the text at a time is avoided.

The display information generation unit 207 outputs the generated or updated display information to the display image combining unit 209.

When the speech detection information indicates that it is outside the speech section, the display information generation unit 207 eliminates the patterned image information of the sound source thereof from the generated display information. However, the speech section and the non-speech section frequently switch to each other. When a state of the non-speech section is not continued for a predetermined amount of time (for example, three seconds) from the time point at which the speech detection information changes from the speech section to the non-speech section, the display information generation unit 207 may eliminate the patterned image information from the generated display information. The display information generation unit 207 outputs the display information eliminated by the patterned image information to the display image combining unit 209 and the sound source selection unit 212. When the display coordinate of the eliminated patterned image information is the sound source display coordinate outside the range, the display information generation unit 207 outputs the display information eliminated by the patterned image information to the display information generation unit 214.

The image decoding unit 208 decodes the image code input from the communication unit 201 to generate an image signal. The decoding method used by the image decoding unit 208 is a decoding method corresponding to the image encoding method used by the image encoding unit 1023. The image decoding unit 208 outputs the generated image signal to the display image combining unit 209.

The display image combining unit 209 combines the image indicated by the image signal input from the image decoding unit 208 and the image indicated by the display information input from the display information generation unit 207, and generates the display image signal shown by the combined image. When generating the display image signal, the display image combining unit 209 may give priority to the image indicated by the display information. That is, when a given pixel is included in the region of the image indicated by the display information, the display image combining unit 209 employs a signal value of the pixel thereof as a signal value of the display image signal. When a given pixel is not included in the region of the pixel indicated by the display information, the display image combining unit 209 employs a signal value included in the image signal input from the image decoding unit 208 regarding the pixel thereof as a signal value of the display image.

The display image combining unit 209 outputs the generated display image signal to the image display unit 210.

The image display unit 210 displays the image indicated by the display image signal input from the display image combining unit 209. The image display unit 210 is, for example, an LCD (Liquid Crystal Display) display.

The operation input unit 211 detects the operation input by a user to generate the coordinate designation information indicating a part of a region of the image displayed by the image display unit 210. As described above, the coordinate designation information may be any of the information indicating one coordinate, the information indicating the elliptical region, and the information indicating the region with a curve. The operation input unit 211 outputs the generated coordinate designation information to the display information generation unit 207. The operation input unit 211 is a pointing device such as a mouse, a tablet, or the like, for example.

The sound source selection unit 212 extracts the elliptical patterned image information, the curve patterned image information or the indication patterned image information, and the utterance patterned image information from the display information input from the display information generation unit 207.

The sound source selection unit 212 determines whether or not there is at least a piece of utterance patterned image information whose display region is included between the coordinate values in the horizontal direction, or between the maximum value and the minimum value of the coordinate values, indicated by the extracted display elliptical patterned image information, the curve patterned image information, or the indication patterned image information. When the utterance patterned image information is present, the sound source selection unit 212 selects the sound source corresponding to the utterance patterned image information. When there is a plurality of sound sources, the sound source selection unit 212 selects the entirety of the plurality of sound sources. The sound source selection unit 212 outputs the selection sound source information indicating the selected sound source to the audio output unit 213 and the display information generation unit 207.

When the entirety of a part of the patterned image information is eliminated, the sound source selection unit 212 excludes the sound source corresponding to the eliminated patterned image information from the selected sound sources.

When there is a plurality of sound sources, the sound source selection unit 212 excludes all sound sources. The sound source selection unit 212 outputs the selection sound source information indicating the excluded sound source to the audio output unit 213.

The audio output unit 213 performs mixing of the audio signal corresponding to the selected sound source indicated by the selection sound source information input from the sound source selection unit 212 from the sound source-classified audio signals input from the sound source separation unit 204, and reproduces the audio indicated by the mixed audio signal. The audio output unit 213 excludes the audio signal corresponding to the excluded sound source indicated by the selection sound source information input from the sound source selection unit 212 from targets to be mixed. Accordingly, the audio indicated by the excluded audio signal is not reproduced.

The control information generation unit 214 receives the sound source direction information from the sound source localization unit 203. The control information generation unit 214 extracts the elliptical patterned image information, the curve patterned image information or the indication patterned image information, and the utterance patterned image information or the playback patterned image information from the display information input from the display information generation unit 207. The control information generation unit 214 extracts the coordinate values in the horizontal direction indicated by the extracted display elliptical patterned image information, the curve patterned image information, or the indication patterned image information, or the maximum value and the minimum value of the coordinate values.

The control information generation unit 214 determines whether or not there is the utterance patterned image information or the playback patterned image information displayed on the sound source display coordinate outside the range, on the extracted coordinate values in the horizontal direction, or between the maximum value and the minimum value of the coordinate values. When there is utterance patterned image information or playback patterned image information, the control information generation unit 214 selects the sound source corresponding to the utterance patterned image information or the playback patterned image information. When there is a plurality of sound sources, the control information generation unit 214 selects one sound source corresponding to a direction which indicates the smallest angle from the front direction, for example.

The control information generation unit 214 generates a control signal indicating an indication to face the head portion of the robot 10 to the direction of the selected sound source. The control information generation unit 214 outputs the generated control signal to the communication unit 201.

Next, an information presentation process according to the embodiment will be described.

Figure 5:
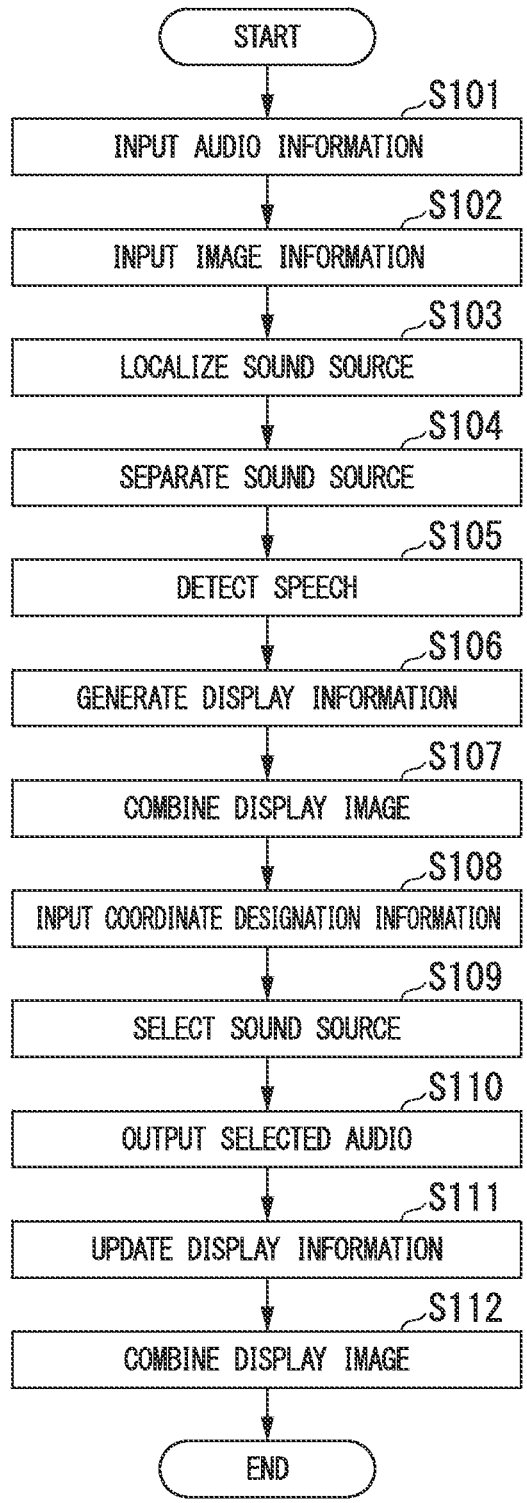
FIG. 5 is a flowchart showing an information presentation process according to the embodiment.

FIG. 5 is a flowchart showing the information presentation process according to the embodiment.
(Step S101)
The audio encoding unit 1012 of the robot 10 performs an A/D conversion for each analog audio signal for each channel input from the sound pick-up units 1011-1 to 1011-N, and generates the digital audio signal for each channel. The audio encoding unit 1012 encodes the generated digital audio signal using the predetermined encoding method, and generates the audio code for each channel. The audio encoding unit 1012 transmits the audio information which is acquired by multiplexing the generated audio code for each channel to the audio decoding unit 202 of the information presentation device 20.

The audio decoding unit 202 separates the audio information received from the audio encoding unit 1012 of the robot into the audio code for each channel. The audio decoding unit 202 decodes the separated audio code to generate the audio signal for each channel. The audio decoding unit 202 outputs the generated audio signal for each channel to the sound source localization unit 203. After that, the process proceeds to step S102.
(Step S102)
The image encoding unit 1023 of the robot encodes the image signal input from the image correction unit 1022 using the predetermined encoding method for each frame, and generates the image code. The image encoding unit 1023 transmits the generated image code to the image decoding unit 208 of the information presentation device 20.

The image decoding unit 208 decodes the image code received from the image encoding unit 1023 of the robot to generate the image signal. The image decoding unit 208 outputs the generated image signal to the displayed image combination unit 209. After that, the process proceeds to step S103.
(Step S103)
The sound source localization unit 203 estimates the direction for each sound source based on the audio signal for each channel input from the audio decoding unit 202. In order to estimate the direction of the sound source, the sound source localization unit 203 uses the MUSIC method, for example. The sound source localization unit 203 outputs the sound source direction information indicating the estimated direction for each sound source to the sound source separation unit 204, the display information generation unit 207, and the control information generation unit 214. The sound source localization unit 203 outputs the audio signal for each channel input from the audio decoding unit 202 to the sound source separation unit 204. After that, the process proceeds to step S104.
(Step S104)
The sound source separation unit 204 receives the sound source direction information and the audio signal for each channel from the sound source localization unit 203. The sound source separation unit 204 separates the audio signal for each sound source from the input audio signal based on the sound source direction information, using the GHDSS method, for example.

The sound source separation unit 204 outputs the audio signal separated for each sound source to the speech detection unit 205 and the audio output unit 213 as the sound source-classified audio signal. After that, the process proceeds to step S105.
(Step S105)
The speech detection unit 205 performs the voice activity detection with respect to the sound source-classified audio signal input from the sound source separation unit 204, and generates the speech detection information indicating whether or not it is in the speech section. The speech detection unit 205 outputs the input sound source-classified audio signal and the speech detection information corresponding to the signal thereof to the speech recognition unit 206. The speech detection unit 205 outputs the speech detection information to the display information generation unit 207. After that, the process proceeds to step S106.
(Step S106)
The display information generation unit 207 converts the direction for each sound source indicated by the sound source direction information input from the sound source localization unit 203 into the display coordinate indicated by the image coordinate system.

When the speech detection information input from the speech detection unit 205 indicates the speech section, the display information generation unit 207 reads out the utterance patterned image information from the memory unit. The display information generation unit 207 generates the display information in which the image indicated by the read utterance patterned image information shows the image included in the converted display coordinate.

When the sound source direction φ indicated by the sound source direction information is outside the range of the viewing angle Φ, the display information generation unit 207 generates the display information in which the image indicated by the read utterance patterned image information indicates the image included in the sound source display coordinate outside the range. The display information generation unit 207 outputs the generated display information to the display image combining unit 209. After that, the process proceeds to step S107.

(Step S107)

The display image combining unit 209 combines the image indicated by the image signal input from the image decoding unit 208 and the image indicated by the display information input from the display information generation unit 207, and generates the display image signal shown by the combined image. The display image combining unit 209 outputs the generated display image signal to the image display unit 210.

The image display unit 210 displays the image indicated by the display image signal input from the display image combining unit 209. After that, the process proceeds to step S108.

(Step S108)

The operation input unit 211 detects the operation input by a user to generate the coordinate designation information, and outputs the generated coordinate designation information to the display information generation unit 207. The display information generation unit 207 reads out the elliptical patterned image information, the curve patterned image information, or the indication patterned image information, according to the coordinate designation information input from the operation input unit 211. The display information generation unit 207 updates the display information so as to include the image which is acquired by disposing the image indicated by the read image information on the region indicated by the coordinate designation information. The display information generation unit 207 outputs the generated display information to the display image combining unit 209 and the sound source selection unit 212. After that, the process proceeds to step S109.

(Step S109)

The sound source selection unit 212 extracts the elliptical patterned image information, the curve patterned image information or the indication patterned image information, and the utterance patterned image information from the display information input from the display information generation unit 207.

The sound source selection unit 212 determines whether or not there is utterance patterned image information whose display region is included between the coordinate values in the horizontal direction, or between the maximum value and the minimum value of the coordinate values, indicated by the extracted display elliptical patterned image information, the curve patterned image information, or the indication patterned image information. When the utterance patterned image information is present, the sound source selection unit 212 selects the sound source corresponding to the utterance patterned image information.

The sound source selection unit 212 outputs the selection sound source information indicating the selected sound source to the audio output unit 213 and the display information generation unit 207. After that, the process proceeds to step S110.

(Step S110)

The audio output unit 213 performs mixing of the audio signal corresponding to the selected sound source indicated by the selection sound source information input from the sound source selection unit 212 from the sound source-classified audio signals input from the sound source separation unit 204, and reproduces the audio indicated by the mixed audio signal. After that, the process proceeds to step S111.

(Step S111)

The display information generation unit 207 receives the selection sound source information from the sound source selection unit 212. The display information generation unit 207 reads out the playback patterned image information from the memory unit. The display information generation unit 207 switches the utterance patterned image information corresponding to the sound source indicated by the selection sound source information, which is the utterance patterned image information included in the previously generated display information, to the read playback patterned image information. The display information generation unit 207 outputs the display information which is updated by switching to the playback patterned image information to the display image combining unit 209. After that, the process proceeds to step S112.

(Step S112)

The display image combining unit 209 combines the image indicated by the image signal input from the image decoding unit 208 and the image indicated by the display information input from the display information generation unit 207, and generates the display image signal shown by the combined image. The display image combining unit 209 outputs the generated display image signal to the image display unit 210.

The image display unit 210 displays the image indicated by the display image signal input from the display image combining unit 209. After that, the process ends.

Next, an example of the display image including the image (utterance patterned image) indicated by the utterance patterned image information displayed by the information presentation device 20 will be described.

Figure 6:
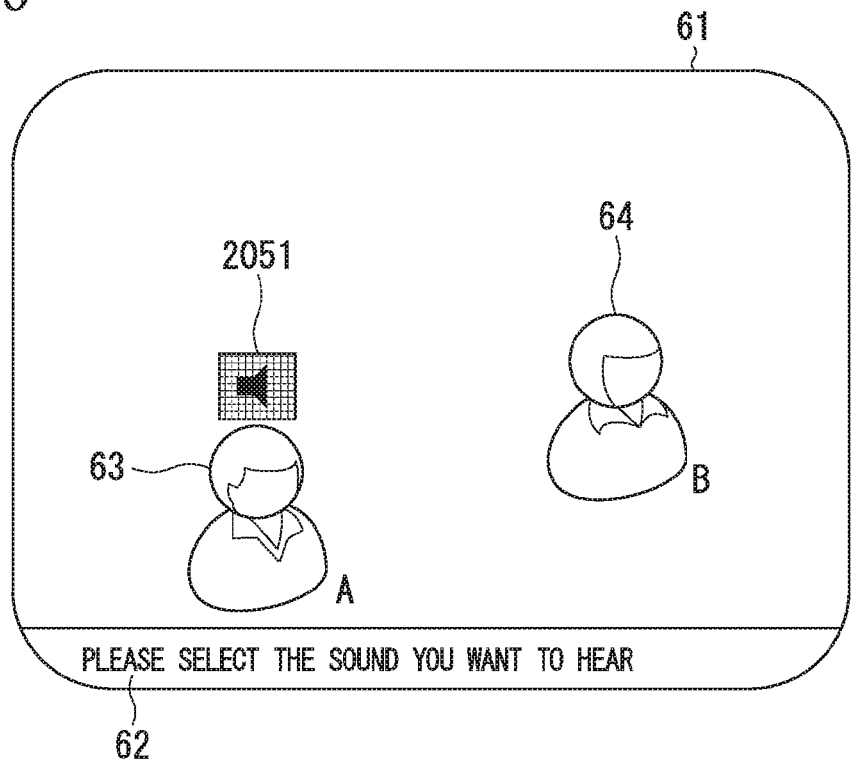
FIG. 6 is a conceptual view showing an example of a displayed image including an utterance patterned image.

FIG. 6 is a conceptual view showing an example of the display image including the utterance patterned image.

The display image 61 shown in FIG. 6 shows an image 63 of a person A in the lower left portion and an image 64 of a person B on a position to the right of the center. On a position to the left of the center of FIG. 6, a rectangle with a lattice pattern attached including a drawing of a speaker in the center is an utterance patterned image 2051. The coordinate of the center point of the image 2051 in the horizontal direction is the same as the coordinate of the person A in the horizontal direction. Accordingly, it is possible for a user to recognize the utterance of the person A. In addition, a text 62 "please select the sound you want to hear" prompting a user to select the sound source is shown in the lower end of FIG. 6.

Next, an example of the display image including the image (indication patterned image) indicated by the indication patterned image information will be described.

Figure 7:
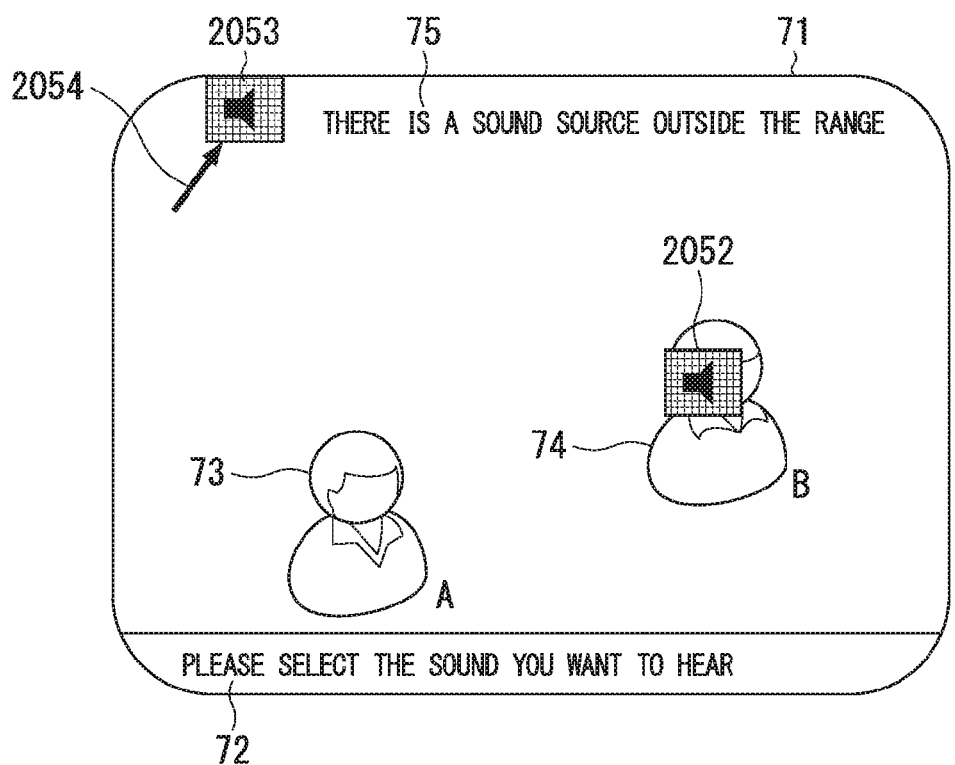
FIG. 7 is a conceptual view showing an example of a displayed image including an indication patterned image.

FIG. 7 is a conceptual view showing an example of the display image including the indication patterned image.

A display image 71 shown in FIG. 7 shows an image 73 of a person A in the lower left portion and an image 74 of a person B on a position to the right of the center. An utterance patterned image 2052 is disposed on the head portion of the person B.

An utterance patterned image 2053 is disposed on the upper left portion of FIG. 7. The position corresponds to the sound source display coordinate outside the range described above. That is, the image 2053 shows that the sound source direction φ of the corresponding sound source is outside the range of the viewing angle Φ. An arrow 2054 of which an ending point faces the image 2053 is an indication patterned image 2054. A text 75 "there is a sound source outside the range" indicating the existence of the sound source outside the display range of the image to a user is displayed on the right side of the image 2054. Accordingly, it is possible for a user to recognize the existence of a sound source in the utterance state outside the display range other than the person B. This prompts a user to select a sound source outside the display range.

Next, an example of the display image including the image (elliptical patterned image) indicated by the elliptical patterned image information and the image (playback patterned image) indicated by the playback patterned image information will be described.

Figure 8:
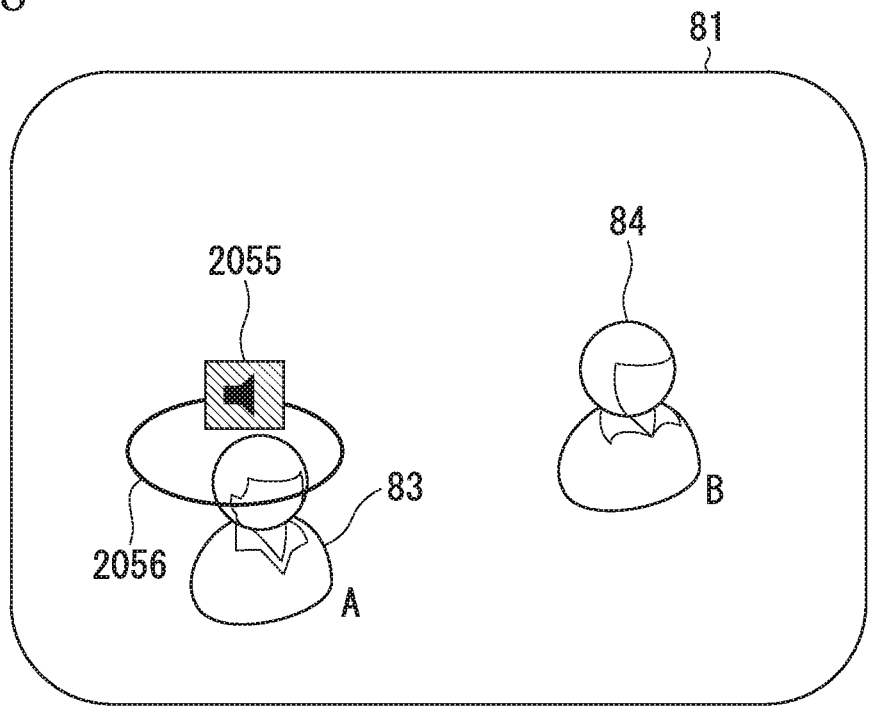
FIG. 8 is a conceptual view showing an example of a displayed image including an elliptical patterned image and playback patterned image.

FIG. 8 is a conceptual view showing an example of the display image including the elliptical patterned image and the playback patterned image.

A display image 81 shown in FIG. 8 shows an image 83 of a person A in the lower left portion and an image 84 of a person B on a position to the right of the center.

A rectangle which is disposed right above the person A, to which a striped pattern is attached from the upper left to the lower right, and which includes a drawing of a speaker in the center, is a playback patterned image 2055. An ellipse crossing the image 2055 is an elliptical patterned image 2056. A center value $X_A$ of a coordinate value in the horizontal direction of the image 2055 corresponding to the estimated direction φ of the sound source (person A) is included between both ends of the image 2056 in the horizontal direction. That is, the display image shown in FIG. 8 shows that the audio of the person A is selected and the selected audio of the person A is reproduced.

Next, an example of the display image including the image (curve patterned image) indicated by the curve patterned image information will be described.

Figure 9:
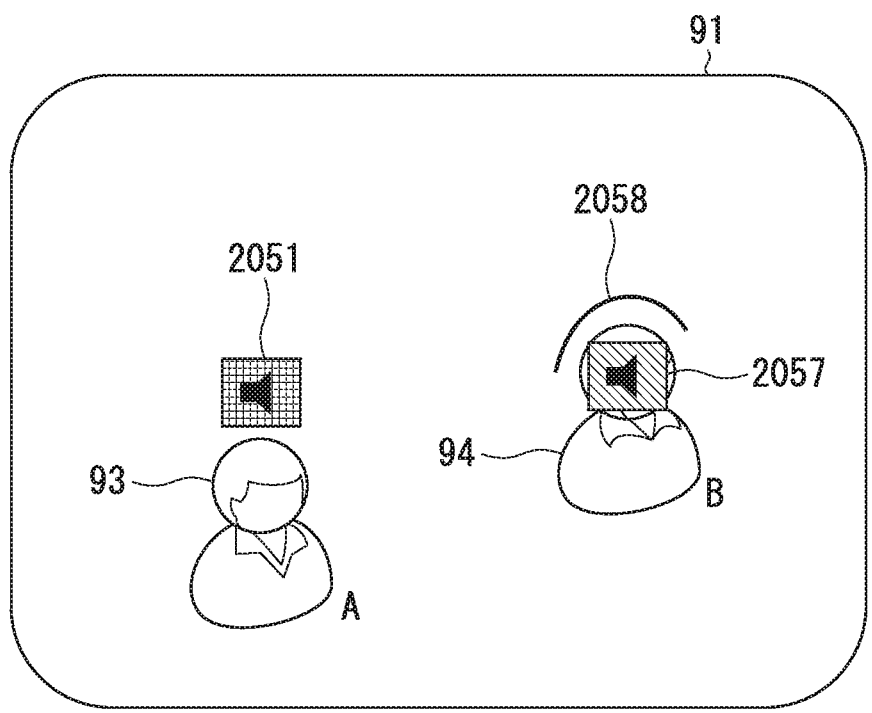
FIG. 9 is a conceptual view showing an example of a displayed image including a curve patterned image.

FIG. 9 is a conceptual view showing an example of the display image including the curve patterned image.

A display image 91 shown in FIG. 9 shows an image 93 of a person in the lower left portion and an image 94 of a person B on a position to the right of the center. The image shown right above the person A is an utterance patterned image 2051. A rectangle which is disposed on head portion of the person B, to which a striped pattern is attached from the upper left to the lower right, and which includes a drawing of a speaker on the center, is a playback patterned image 2057. A curve passing right above the image 2057 is a curve patterned image 2058. A center value $X_B$ of a coordinate value in the horizontal direction of the image 2057 corresponding to the direction φ of the sound source (person B) estimated by the sound source localization unit 203 is included between both ends of the image 2058 in the horizontal direction. That is, the display image shown in FIG. 9 shows that the audio of the person B is selected and the selected audio of the person B is displayed. Meanwhile, the display image shown in FIG. 9 shows that the person A is in the utterance state but is not selected as a target for displaying the audio thereof.

Next, an example of the display image including the image (text patterned image) indicated by the text patterned image information will be described.

Figure 10:
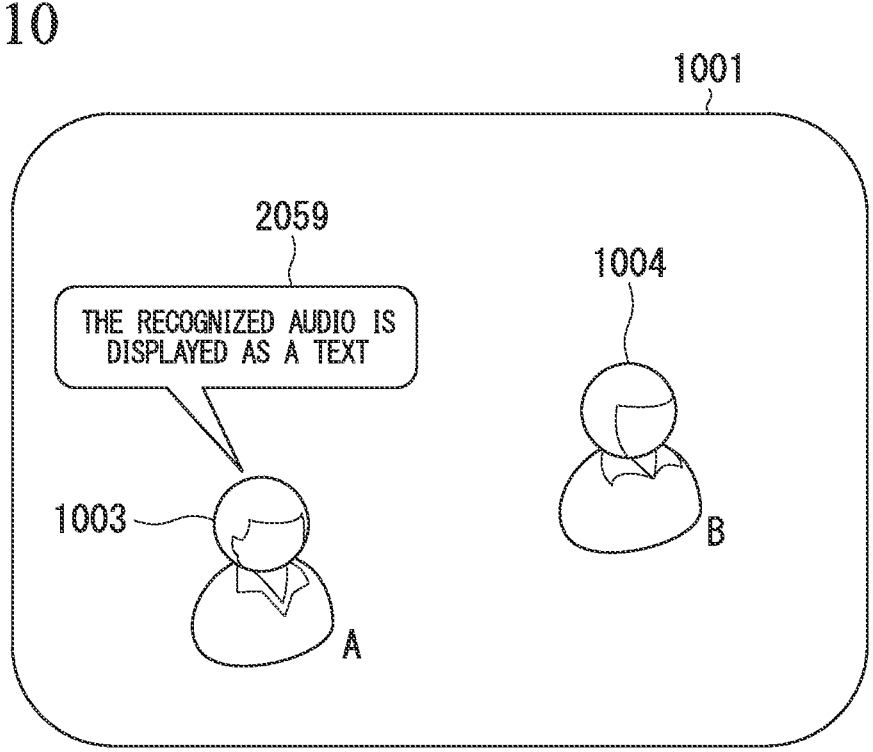
FIG. 10 is a conceptual view showing an example of a displayed image including a text patterned image.

FIG. 10 is a conceptual view showing an example of the display image including the text patterned image.

A display image 1001 shown in FIG. 10 shows an image 1003 of a person A on the lower left portion and an image 1004 of a person B on a position to the right of the center. The image shown right above the person A is a text patterned image 2059. A text "the recognized audio is displayed as a text" included in a region of the image 2059 is a text generated based on the audio signal of the person A by the speech recognition unit 206. Accordingly, a user can understand the utterance content of the person A.

As in the same manner as the examples shown in FIGS. 6 to 9, the embodiment may be designed so as to receive the operation input, of indicating the coordinate of the entire or a part (apex as the representative point) of display region of the image 2059, by a user. In this case, in the embodiment, the sound source selection unit 212 selects the audio signal which indicates the utterance state of the person A, and the audio output unit 213 reproduces the audio of the person A based on the selected audio signal.

Next, an example of a process of estimating the direction of the sound sources using the MUSIC method by the sound source localization unit 203 will be described later.

The sound source localization unit 203 includes the memory unit (not shown) in which a transfer function $a_{\phi i}(\omega)$ from the sound sources to the sound pick-up units 1011-I corresponding to each channel i (i is the integer 1≤i≤N) for each sound source direction φ is stored in advance. N-dimensional vectors $[a_{\phi 1}(\omega), a_{\phi 2}(\omega), \ldots, a_{\phi N}(\omega)]$ with the transfer function $a_{\phi i}(\omega)$ as a factor is called the transfer function vectors $va_\phi(\omega)$.

Figure 11:
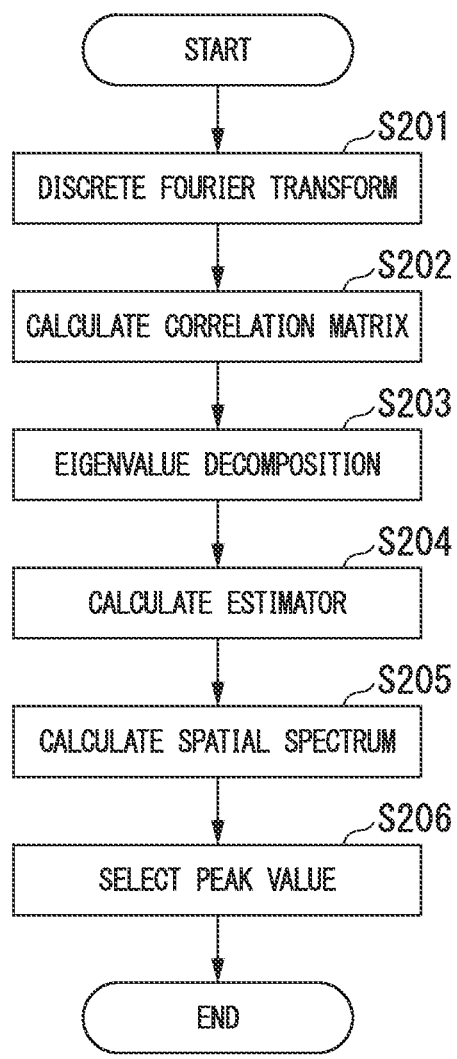
FIG. 11 is a flowchart showing a sound source direction estimating process according to the embodiment.

FIG. 11 is a flowchart showing a sound source direction estimating process according to the embodiment.
(Step S201)

The sound source localization unit 203 performs a Discrete Fourier Transform (DFT) with respect to audio signals $x_i(k)$ (k is the integer indicating sample time series) for each channel i, to generate frequency region signal $x_i(\omega)$ (ω is the frequency). After that, the process proceeds to step S202.
(Step S202)

The sound source localization unit 203 calculates correlation matrix R (ω) with N rows and N columns with cross correlation of the frequency region signal xi (ω) between channels for each frequency ω as the factor. When the correlation matrix R (ω) is calculated, the sound source localization unit 203 uses Equation (2), for example.
Equation 2

$$R(\omega) = E[vx(\omega)vx^H(\omega)] \quad (2)$$

In Equation (2), E[ . . . ] indicates an expectation value of " . . . ". vx (ω) are N-dimensional vectors $[x_1(\omega), x_2(\omega), \ldots, x_N(\omega)]$ with the frequency region signal $x_i(\omega)$ as the factor. H indicates the conjugate transpose of the vectors or matrix. At that time, the process proceeds to step S203.
(Step S203)

The sound source localization unit 203 performs the eigenvalue decomposition of the correlation matrix R (ω) to calculate N eigenvalues $\lambda_i(\omega)$ and eigen vectors $e_i(\omega)$. The correlation matrix R (ω), the eigenvalue $\lambda_i(\omega)$, and the eigen vectors $e_i(\omega)$ satisfies the relationship indicated in Equation (3).
Equation 3

$$R(\omega) = E(\omega)\Lambda(\omega)E^{-1}(\omega) \quad (3)$$

In Equation (3), E (ω) is a matrix with N rows and N columns $[e_1(\omega), e_2(\omega), \ldots, e_N(\omega)]$ with the eigen vectors $e_i(\omega)$ as the factor. Λ(ω) is a diagonal matrix with N rows and N columns including N eigenvalues $\lambda_1(\omega), \lambda_2(\omega), \ldots, \lambda_N(\omega)$ as the diagonal factor. Herein, index i indicates the order of the eigen vectors $e_i(\omega)$ in the matrix $E(\omega)$ and the order of the eigenvalue $\lambda_i(\omega)$ of the matrix $\Lambda(\omega)$. The sound source localization unit 203 determines the index i in descending order of the eigenvalues $\lambda_i(\omega)$ so as to be 1 with respect to the maximum eigenvalues $\lambda_i(\omega)$ and N with respect to the minimum eigenvalues $\lambda_i(\omega)$. After that, the process proceeds to step S204.

(Step S204)

The sound source localization unit 203 reads out the transfer function vectors $va_\phi(\omega)$ for each sound source direction $\phi$ from the memory unit, and calculates MUSIC estimator P ($\omega$, $\phi$) as the index value for each frequency, based on the read transfer function vectors $va_\phi(\omega)$ and the calculated eigen vectors $e_i(\omega)$. In order to calculate the MUSIC estimator P ($\omega$, $\phi$), the sound source localization unit 203 uses Equation (4), for example.

Equation 4

$$P(\omega, \phi) = \frac{|va_\phi^H(\omega)va_\phi(\omega)|}{\sum_{i=L+1}^{N} |va_\phi^H(\omega)e_i(\omega)|} \quad (4)$$

In Equation (4), L is the number of predetermined sound sources, is equal to or bigger than 1, and is an integer smaller than N. In Equation (4), the MUSIC estimator P ($\omega$, $\phi$) indicates the power (numerator) of the transfer function vectors $va_\phi(\omega)$ from the direction $\phi$ with respect to the sum (denominator) of inner product of transfer function vectors $va_\phi(\omega)$ and the eigen vectors $e_i(\omega)$ which does not contribute to N-L sound sources. That is, the MUSIC estimator P ($\omega$, $\phi$) is the index indicating the strength of the sound wave which approaches from the direction $\phi$ for each frequency $\omega$. After that, the process proceeds to step S205.

(Step S205)

The sound source localization unit 203 calculates spatial spectrum P ($\phi$) of the frequency band of the predetermined audio for each detected sound source direction $\phi$, using the MUSIC estimator P ($\omega$, $\phi$) and the maximum eigenvalues $\lambda_1(\omega)$. When calculating spatial spectrum P ($\phi$), the sound source localization unit 203 uses Equation (5), for example.

Equation 5

$$P(\phi) = \sum_{\omega=\omega_{min}}^{\omega_{max}} \sqrt{\lambda_1(\omega)} \, P(\omega, \phi) \quad (5)$$

In Equation (5), $\omega_{min}$ indicates the lowest frequency of the frequency band, and $\omega_{max}$ indicates the highest frequency. That is, Equation (5) indicates that the multiplication value of the square root of the MUSIC estimator P ($\omega$, $\phi$) and the maximum eigenvalues $\lambda_1(\omega)$ is added over the frequency component to calculate the spatial spectrum P ($\phi$). Accordingly, the frequency component with high MUSIC estimator P ($\omega$, $\phi$) is strongly reflected to the spatial spectrum P ($\phi$). After that, the process proceeds to step S206.

(Step S206)

The sound source localization unit 203 extracts the peak value (maximum value) of the spatial spectrum P ($\phi$) and selects the peak value (maximum value) which is an L-th bigger value from the maximum value (first value) thereof. Herein, the sound source localization unit 203 rejects the peak value which is smaller than the predetermined threshold value. In this case, the sound source localization unit 203 subtracts the number of the rejected peak values from the predetermined sound source values L, and updates the sound source numbers L.

The sound source localization unit 203 generates the sound source direction information indicating the sound source direction $\phi$ corresponding to each of the selected peak value. After that, the process ends.

Next, an example of a process of separating the audio signal for each sound source using the GDHSS by the sound source separation unit 204 will be described.

The sound source separation unit 204 includes the memory unit (not shown) in which the transfer function $a_{\phi i}(\omega)$ from the sound sources to the sound pick-up units 1011-$i$ corresponding to each channel i for each sound source direction $\phi$ is stored in advance. Herein, when the sound source localization unit 203 employs the MUSIC method, any one of the sound source localization unit 203 and the sound source separation unit 204 may include the memory unit and another one may omit it. In this case, the sound source localization unit 203 and the sound source separation unit 204 may share the memory unit.

Figure 12:
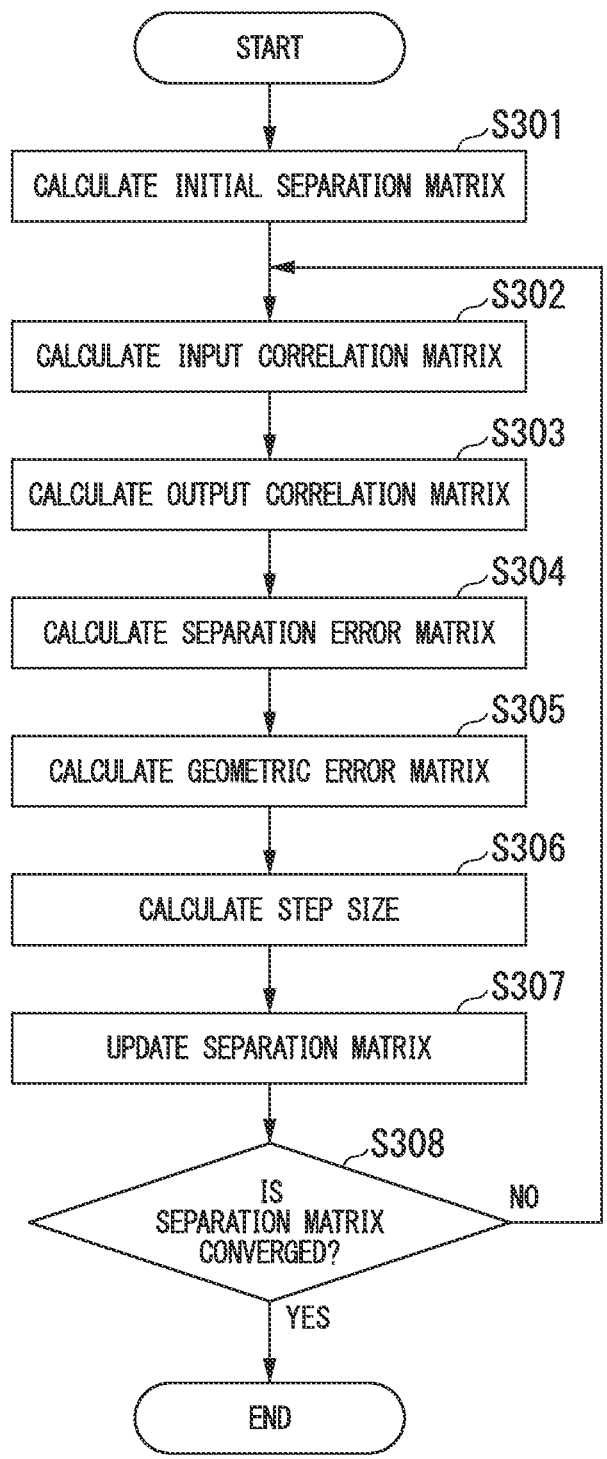
FIG. 12 is a flowchart showing a sound source separating process according to the embodiment.

FIG. 12 is a flowchart showing a sound source separating process according to the embodiment.

(Step S301)

The sound source separation unit 204 reads out the transfer function vectors $va_\phi(\omega)$ corresponding to each sound source direction indicated by the sound source direction information input from the sound source localization unit 203, from the memory unit. The sound source separation unit 204 integrates the read L transfer function vectors $va_\phi(\omega)$ to configure the transfer function matrix A with N rows and L columns. An initial separation matrix $W_{init}$ is a pseudo inverse matrix of the transfer function matrix A, for example. The sound source separation unit 204 calculates the initial separation matrix $W_{init}$ based on the configured transfer function matrix A. The initial separation matrix $W_{init}$ is an initial value of the separation matrix W. After that, the process proceeds to step S302.

(Step S302)

The sound source separation unit 204 performs DFT for each frame with respect to the audio signal xi (k) for each channel i input from the sound source localization unit 203, and generates the frequency region signal xi ($\omega$) for each channel i. The sound source separation unit 204 configures the frequency region signal vectors vx ($\omega$) with N rows with the frequency region signal xi ($\omega$) for each channel i as the factor. The sound source separation unit 204 calculates the input correlation matrix $R_{xx}(\omega)$ with N rows and N columns with the cross correlation of the frequency region signal xi ($\omega$) between channels for each frequency $\omega$ as the factor, using Equation (2), for example. After that, the process proceeds to step S303.

(Step S303)

The sound source separation unit 204 multiplies the separation matrix W by the frequency region signal vectors vx ($\omega$) to calculate the frequency region sound source vector vy ($\omega$). The frequency region sound source vector vy ($\omega$) is a vector with the frequency region sound source signal $y_1(\omega)$ for each sound source 1 as the factor. The sound source separation unit 204 calculates an output correlation matrix $R_{yy}(\omega)$ from the frequency region sound source vector vy ($\omega$) for each frequency co, using Equation (2), for example. After that, the process proceeds to step S304.

(Step S304)

The sound source separation unit 204 subtracts the diagonal matrix diag [$R_{yy}(\omega)$] from the output correlation matrix $R_{yy}(\omega)$ to calculate the matrix $E_{SS}(\omega)$. That is, the matrix $E_{SS}$ (ω) is the matrix indicating an off-diagonal component of the output correlation matrix $R_{yy}$ (ω). As indicated in Equation (6), the sound source separation unit 204 multiplies the separation matrix W by the input correlation matrix $R_{xx}$ (ω) and the constant of 2 by the matrix $E_{SS}$ (ω) to calculate a separation error matrix J'ss (ω).

Equation 6

$$J'_{SS}(\omega) = 2E_{SS}(\omega) W R_{xx}(\omega) \quad (6)$$

The separation error matrix J'ss (ω) is a matrix which is derived by differentiating the separation sharpness Jss (ω) with respect to each factor value of the input correlation matrix $R_{xx}$ (ω). The separation sharpness Jss (ω) is an index value indicating a degree of separation error of one sound source as another sound source. After that, the process proceeds to step S305.

(Step S305)

The sound source separation unit 204 subtracts a unit matrix I from the sum of separation matrix W and the transfer function matrix A to calculate a matrix $E_{GC}$ (ω).

That is, the matrix $E_{GC}$ (ω) is a matrix indicating the error of the separation matrix W. As indicated in Equation (7), the sound source separation unit 204 derives a geometric error matrix $J'_{GC}$ (ω) by multiplying the matrix $E_{GC}$ (ω) by the conjugate transpose matrix of the transfer function matrix A.

Equation 7

$$J'_{GC}(\omega) = E_{GC}(\omega) A^H \quad (7)$$

The geometric error matrix $J'_{GC}$ (ω) is a matrix which is derived by differentiating a geometric constraint JGC (ω) with respect to each factor value of the input correlation matrix $R_{xx}$ (ω). The geometric constraint JGC (ω) is an index value indicating the degree of error of the frequency region sound source vector vy (ω). After that, the process proceeds to step S306.

(Step S306)

The sound source separation unit 204 derives a step side $\mu_{CG}$ using Equation (8) for example, based on the matrix $E_{GC}$ (ω) and geometric error matrix $J'_{GC}$ (ω).

Equation 8

$$\mu_{GC} = \frac{|E_{GC}(\omega)|^2}{2|J'_{GC}(\omega)|^2} \quad (8)$$

In Equation (8), $|\ldots|^2$ indicates a Frobenius norm. The Frobenius norm is the summation of over all factors of the square of the absolute value of factor value configuring matrix.

In addition, the sound source separation unit 204 derives a step size $\mu_{SS}$ using Equation (9), for example, based on the matrix $E_{SS}$ (ω) and the separation error matrix $J'_{SS}$ (ω).

Equation 9

$$\mu_{SS} = \frac{|E_{SS}(\omega)|^2}{2|J'_{SS}(\omega)|^2} \quad (9)$$

After that, the process proceeds to step S307.

(Step S307)

The sound source separation unit 204 performs a weighted sum on the separation error matrix $J'_{SS}$ (ω) and geometric error matrix $J'_{GC}$ (ω) with the step sizes of $\mu_{SS}$ and $\mu_{GC}$ respectively, to calculate the update matrix ΔW of the separation matrix. The sound source separation unit 204 subtracts the update matrix ΔW from the separation matrix W to update the separation matrix W. After that, the process proceeds to step 308.

(Step S308)

The sound source separation unit 204 determines whether or not the change of the separation matrix W is converged. For example, the sound source separation unit 204 calculates a ratio of the norm of the separation matrix W with respect to the norm of the update matrix ΔW as an index value, and determines it is converged when the index value becomes smaller than the preset value. When it is determined that the change of the separation matrix W is converged (step S308; Y), the process ends. The sound source separation unit 204 performs an Inverse Discrete Fourier Transform (IDFT) of the frequency region sound source signal $y_1$ (ω) for each sound source 1 calculated using the converged separation matrix W to generate the audio signal $y_1$ (k) separated for each sound source 1. When it is determined that the change of the separation matrix W is not converged (step S308; N), the process proceeds to step S302.

Next, an example of the motion controlling process according to the embodiment will be described.

This process is a process to be performed after step S112 when the sound source whose sound source direction φ is determined to be outside the range of the viewing angle Φ is selected as the target to reproduce the audio in step S106 (see FIG. 5). However, the display information generation unit 207 of the information presentation device 20 in step S111 outputs the updated display information to the control information generation unit 214.

Figure 13:
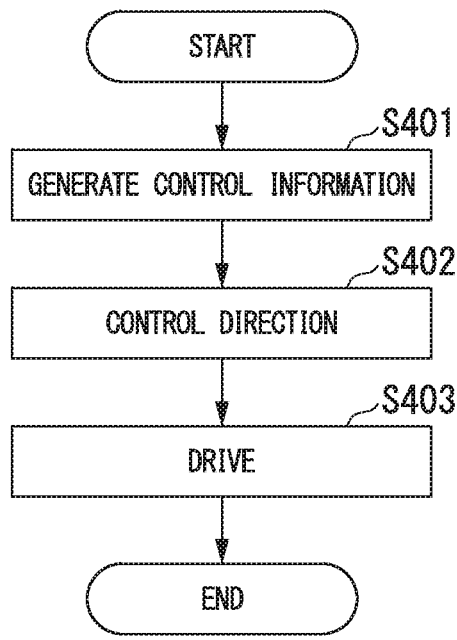
FIG. 13 is a flowchart showing an example of a motion controlling process according to the embodiment.

FIG. 13 is a flowchart showing the example of the motion controlling process according to the embodiments.

(Step S401)

The control information generation unit 214 receives the sound source direction information from the sound source localization unit 203. The elliptical patterned image information, the curve patterned image information or the indication patterned image information, and the utterance patterned image information or the playback patterned image information are extracted from the display information input from the display information generation unit 207. The control information generation unit 214 extracts the coordinate value in the horizontal direction indicated by the extracted display elliptical patterned image information, the curve patterned image information or the indication patterned image information, or the maximum value and the minimum value of the coordinate values.

The control information generation unit 214 determines whether or not there is the utterance patterned image information or the playback patterned image information displayed on the sound source display coordinate outside the range, on the extracted coordinate values in the horizontal direction, or between the maximum value and the minimum value of the coordinate values. When there is the utterance patterned image information or the playback patterned image information, the control information generation unit 214 selects the sound source corresponding to the utterance patterned image information or the playback patterned image information. The control information generation unit 214 generates a control signal indicating an indication to face the head portion to the direction of the selected sound source. The control information generation unit 214 outputs the generated control signal to the motion control unit 106 of the robot 10. After that, the process proceeds to step S402.

(Step S402)

The motion control unit 106 reads out the power model information corresponding to the control information input from the communication unit 104 from the memory unit.

The motion control unit 106 determines the power value for each component corresponding to the position information input from the position information acquisition unit 105, by referring to the read power model information. The motion control unit 106 outputs the power having the predetermined power value to the corresponding component of the motion mechanism unit 107. After that, the process proceeds to step S403.

(Step S403)

Each component configuring the motion mechanism unit 107 is driven by the power supplied from the motion control unit 106. After that, the process ends.

By performing the processes shown in FIG. 13, the head portion of the robot 10 faces a direction of the indicated sound source (for example, the person D (see FIG. 4)). An example of the display image displayed at this time will be described.

Figure 14:
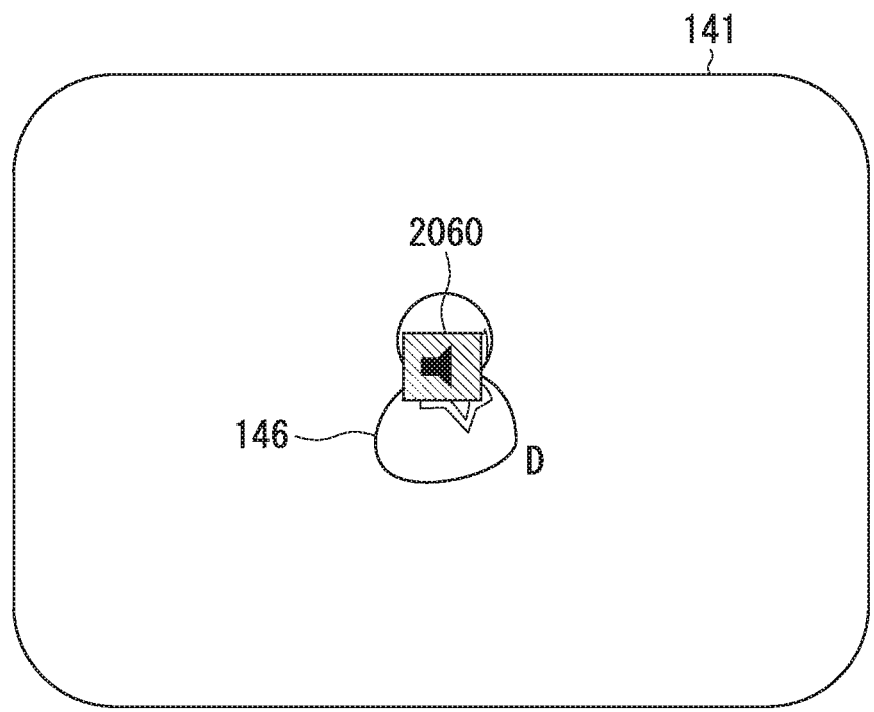
FIG. 14 is a conceptual view showing another example of a displayed image.

FIG. 14 is a conceptual view showing another example of the display image.

A display image 141 shown in FIG. 14 shows an image 146 of a person D in the center. The image shown between the head portion and the body portion of the person D is a playback patterned image 2060. That is, the display image 141 shows that the robot 10 faces the front in a direction of the person D and the optical axis of the imaging unit 1021 is incident. In addition, the display image 141 shows that the audio of the person D in the utterance state is selected as a target to be reproduced.

Next, another example of the motion controlling process according to the embodiment will be described.

This example is an example of a process of correcting the image based on the motion detected by the motion control unit 106.

Figure 15:
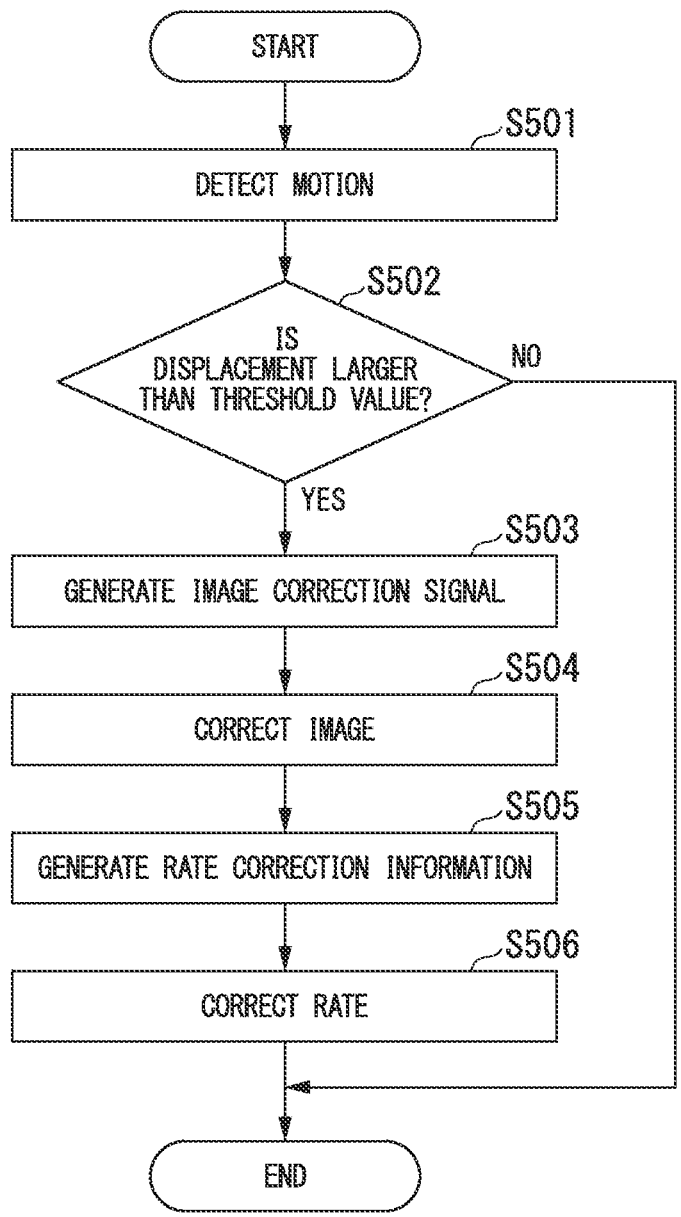
FIG. 15 is a flowchart showing another example of a motion controlling process according to the embodiment.

FIG. 15 is a flowchart showing another example of the motion controlling process according to the embodiment.

(Step S501)

The position information acquisition unit 105 generates position information based on the displacement detected by the position sensor included in the position information acquisition unit. The position information acquisition unit 105 outputs the generated position information to the motion control unit 106. After that, the process proceeds to step S502.

(Step S502)

The motion control unit 106 calculates the displacement of the current value of the position information input from the position information acquisition unit 105 and the previous value at past preceeding for a predetermined amount of time, and determines whether or not the calculated displacement is larger than the predetermined threshold value. When it is determined that the displacement is larger than the threshold value (step S502; Y), the process proceeds to step S503. When it is determined that the displacement is equal to or smaller than the threshold value (step S502; N), the process ends.

(Step S503)

The motion control unit 106 calculates the movement speed for each pixel from the calculated displacement, and calculates the movement amount for each pixel based on the calculated movement speed. The motion control unit 106 generates an image correction signal, indicating values obtained by inverting the positive and negative values of the calculated movement amount, as the coordinate correction amount. The motion control unit 106 outputs the generated image correction signal to the image correction unit 1022. After that, the process proceeds to step S504.

(Step S504)

The image correction unit 1022 corrects the image signal input from the imaging unit 1021 based on the image correction signal input from the motion control unit 106. Herein, the image correction unit 1022 generates the corrected image signal by moving the coordinate of the signal value included in the converted image signal for an amount of the coordinate correction indicated by the image correction signal. The image correction unit 1022 outputs the corrected image signal to the image encoding unit 1023. After that, the process proceeds to the step S505.

(Step S505)

The motion control unit 106 generates the rate correction signal which indicates levels of the bit rates according to the encoding method used by the image encoding unit 1023 and which indicates lower bit rates as the calculated displacement is large. The motion control unit 106 outputs the generated rate correction signal to the image encoding unit 1023. After that, the process proceeds to step S506.

(Step S506)

The image encoding unit 1023 updates the bit rate in the encoding to the bit rate indicated by the rate correction signal input from the motion control unit 106. After that, the process ends.

Accordingly, the movement of the image generated by movement of the optical axis of the imaging unit 1021 is compensated and the resolution or frames of the moved image is thinned out. Accordingly, the degradation of the image quality is suppressed.

As described above, in the embodiment, the audio signal is input, the image signal is input, and the image indicated by the image signal is displayed. Then, in the embodiment, the direction information for each sound source based on the audio signal is estimated, the sound source-classified audio signal for each sound source is separated from the audio signal, an operation input is received, and the coordinate designation information indicating a part of the region of the image is generated. In addition, in the embodiment, the sound source-classified audio signal of a sound source associated with the coordinate which is included in the region indicated by the coordinate designation information, and which corresponds to the direction information is selected. Accordingly, it is easy to understand the utterance content.

Second Embodiment

Next, a second embodiment of the present invention will be described with reference to the drawings.

The same configuration as the first embodiment is referenced by the same reference numerals.

An information transmission system 2 according to the embodiment includes a robot 40, an information presentation device 50, and a network 30.

Figure 16:
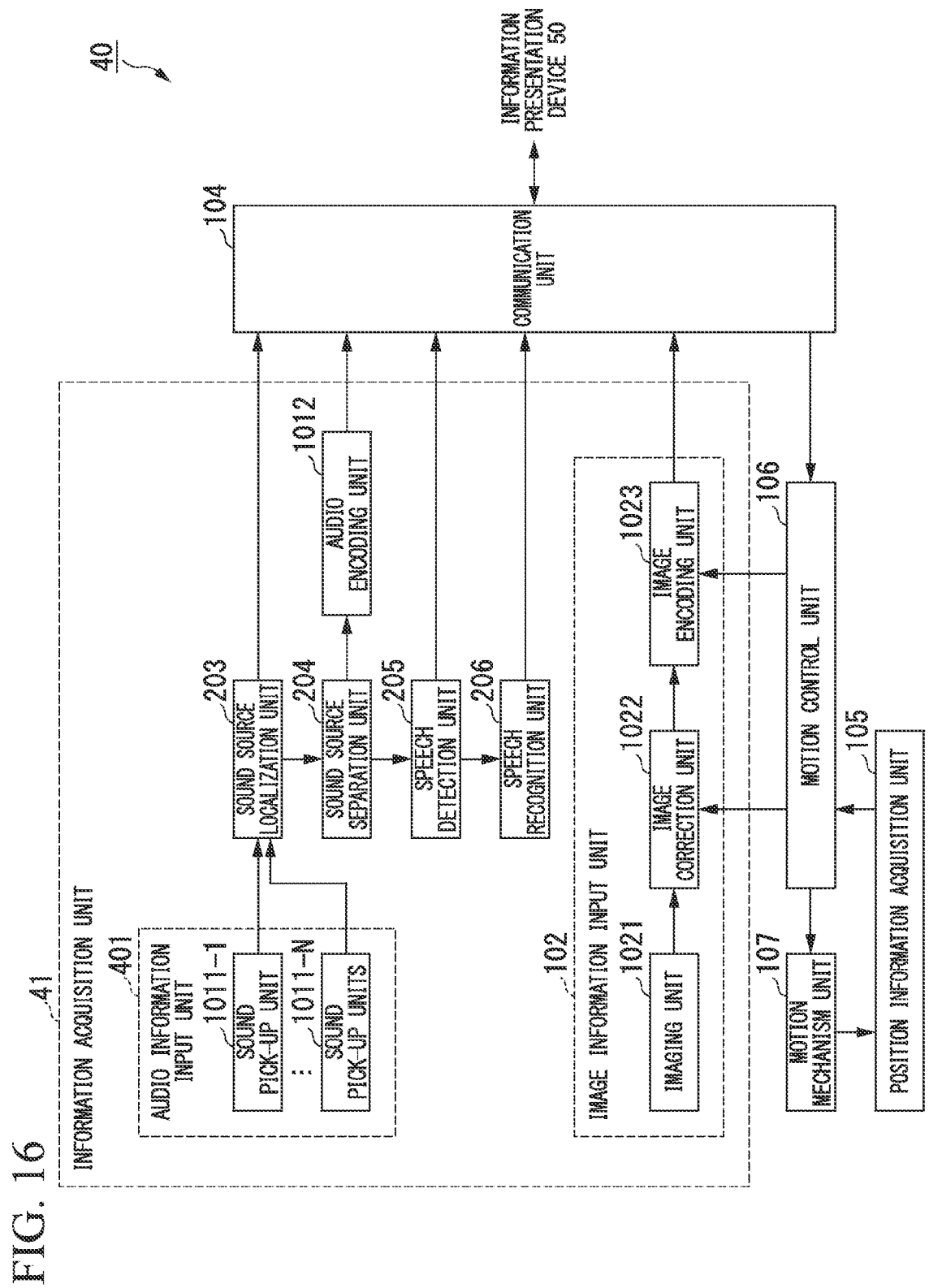
FIG. 16 is a schematic view showing a configuration of a robot according to a second embodiment of the present invention.

FIG. 16 is a conceptual view showing a configuration of the robot 40 according to the embodiment.

The robot 40 includes an information acquisition unit 41, the communication unit 104, the position information acquisition unit 105, the motion control unit 106, and the motion mechanism unit 107.

The information acquisition unit 41 includes an audio information input unit 401, the audio encoding unit 1012, the image information input unit 102, the sound source localization unit 203, the sound source separation unit 204, the speech detection unit 205, and the speech recognition unit 206. The audio information input unit 401 includes the sound pick-up units 1011-1 to 1011-N.

That is, the robot 40 includes configuration units which are included in the robot 10 (see FIG. 1) and the sound source localization unit 203, the sound source separation unit 204, the speech detection unit 205, and the speech recognition unit 206 which are included in the information presentation device 20 (see FIG. 3).

Figure 17:
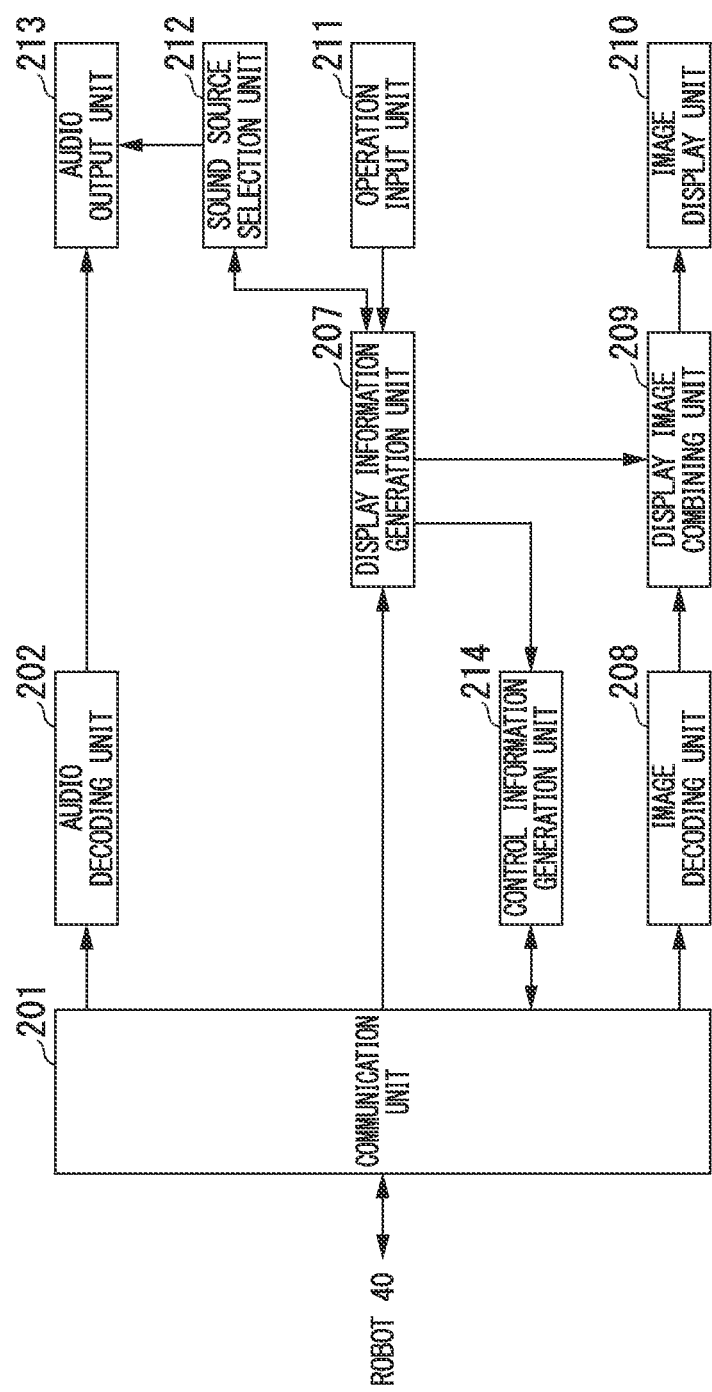
FIG. 17 is a schematic view showing a configuration of an information presentation device according to the embodiment.

FIG. 17 is a conceptual view showing a configuration of the information presentation device 50 according to the embodiment.

The information presentation device 50 includes the communication unit 201, the audio decoding unit 202, the display information generation unit 207, the image decoding unit 208, the display image combining unit 209, the image display unit 210, the operation input unit 211, the sound source selection unit 212, the audio output unit 213, and the control information generation unit 214.

That is, the information presentation device 50 is configured by omitting the sound source localization unit 203, the sound source separation unit 204, the speech detection unit 205, and the speech recognition unit 206 included in the information presentation device 20 (see FIG. 4).

Accordingly, in the embodiment and the first embodiment, the disposition of the sound source localization unit 203, the sound source separation unit 204, the speech detection unit 205, and the speech recognition unit 206 are different from each other, however, the same processes are performed and the same actions and effects are obtained.

Herein, in the robot 40, the audio encoding unit 1012 transmits the audio signal for each sound source separated by the sound source separation unit 204 to the audio decoding unit 202 of the information presentation device 50. The sound source localization unit 203 transmits the generated sound source direction information to the display information generation unit 207 and the control information generation unit 214 of the information presentation device 50. The speech detection unit 205 transmits the generated speech detection information to the display information generation unit 207 of the information presentation device 50. The speech recognition unit 206 transmits the generated text information to the display information generation unit 207 of the information presentation device 50.

Meanwhile, in the information presentation device 50, the audio decoding unit 202 decodes the audio code for each sound source received from the audio encoding unit 1012 of the robot 40 through the communication unit 201 to generate the audio signal, and outputs the generated audio signal to the audio output unit 213. The display information generation unit 207 generates the display information based on the sound source direction information received from the sound source localization unit 203 of the robot 40 through the communication unit 201, the speech detection information received from the speech detection unit 205, and the text information received from the speech recognition unit 206. The control information generation unit 214 generates the control information based on the sound source direction information received from the sound source localization unit 203 of the robot 40 through the communication unit 201 and the display information input from the display information generation unit 207.

Next, a verification performed using the information transmission system 1 (see FIG. 1) will be described.

Figure 19:
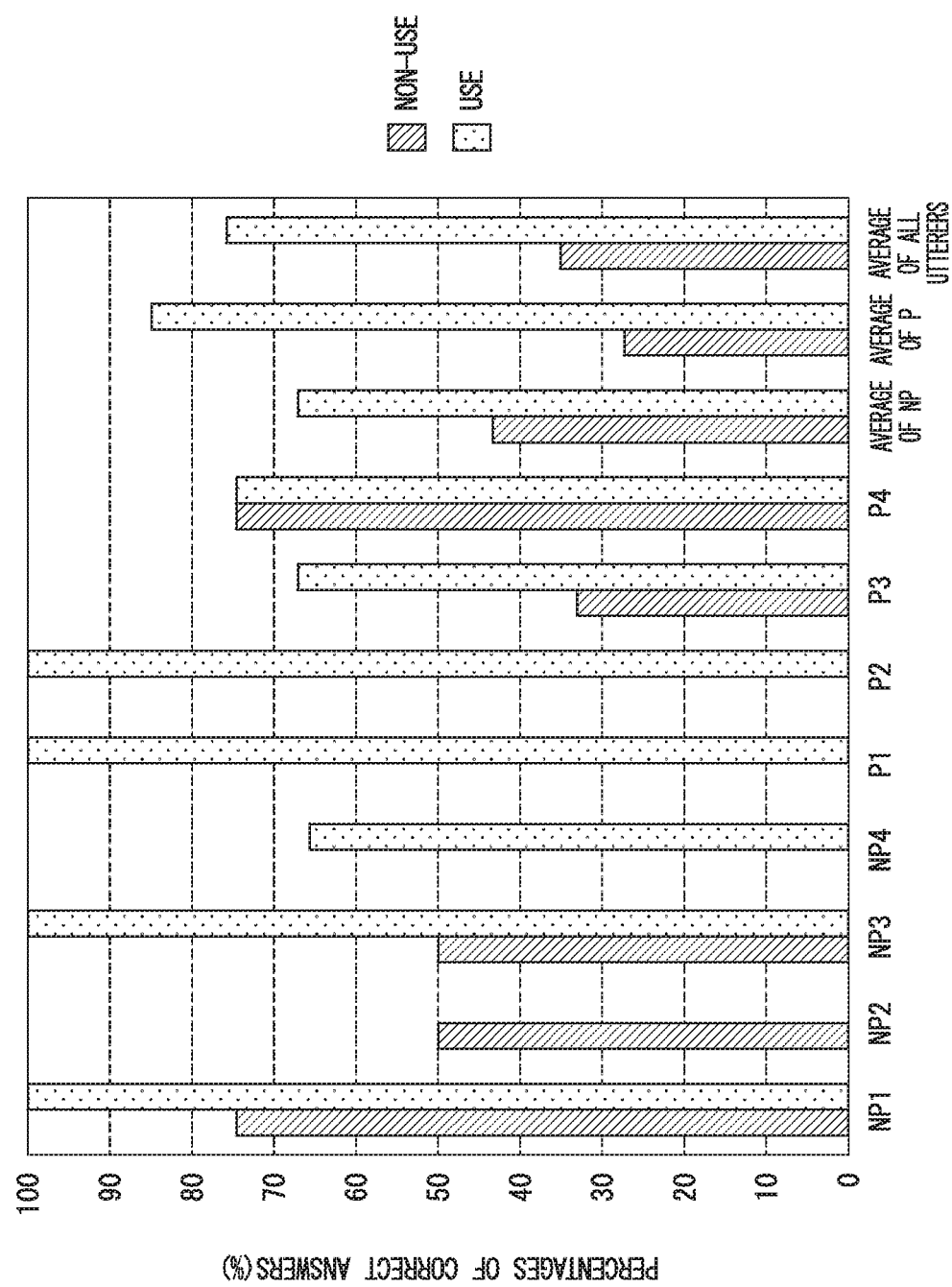
FIG. 19 is a view showing an example of percentages of correct answers for each user.

In the experiment setting, at 30° to the left and 30° to the right with respect to the robot 10, a moving image and audio indicating that two pairs of two utterers (four, in total) in the utterance state under the noise environment are recorded. Two types of the recorded scenes are prepared. An example of the utterance section of one scene is shown in FIG. 19.

Figure 18:
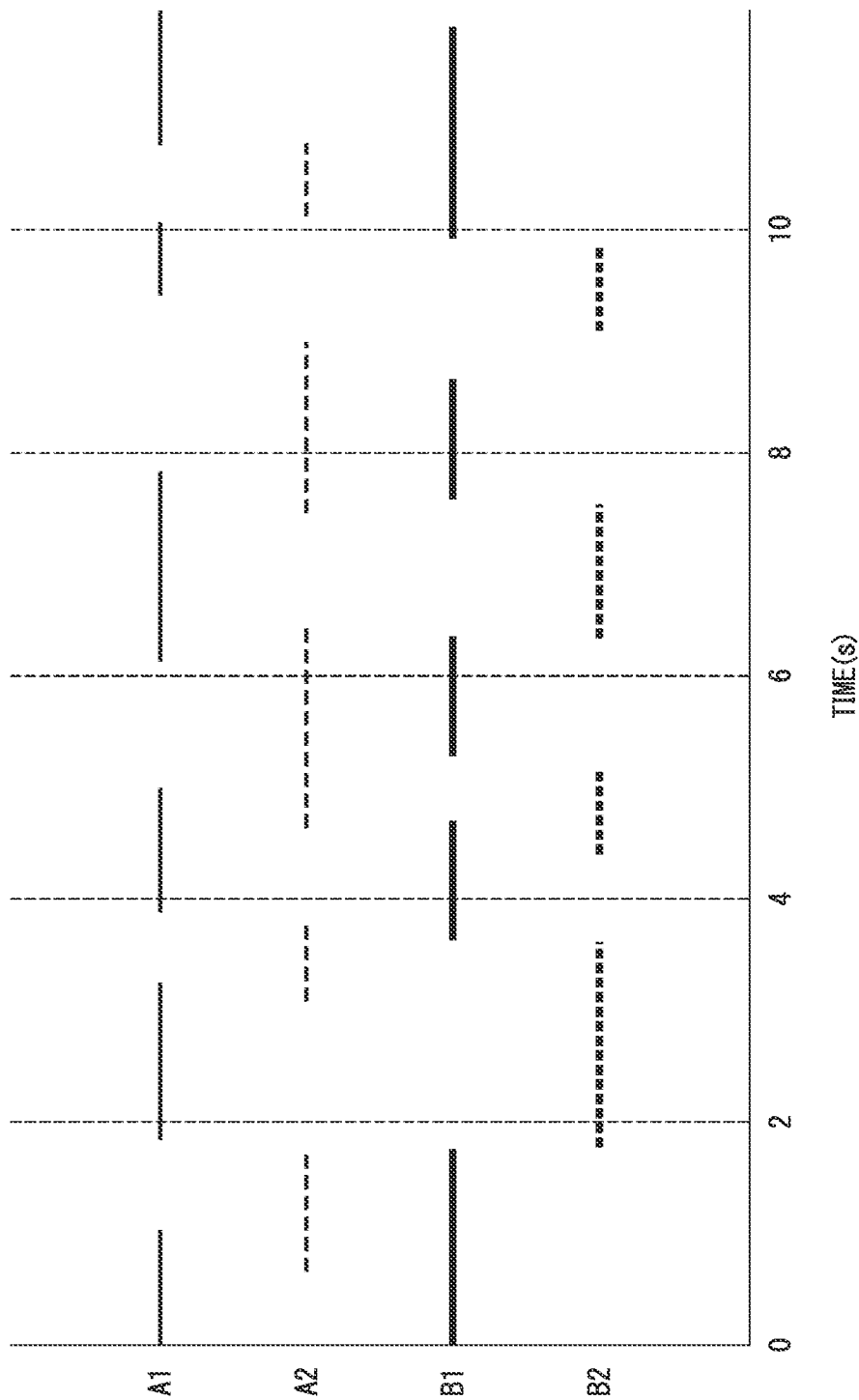
FIG. 18 is a view showing an example of utterance sections.

FIG. 18 is a view showing an example of the utterance section.

The vertical axis indicates utterers A1, A2, B1, and B2 from the top to the bottom. The horizontal axis indicates the time.

The utterers A1 and A2 are utterers who talked to each other at 30° to the left of the robot. The utterers B1 and B2 are utterers who talked to each other at 30° to the right of the robot. According to FIG. 19, the utterers A1 and A2, and the utterers B1 and B2 alternate talking to each other. However, when comparing the pair of utterers A1 and A2 and the pair of utterers B1 and B2, the utterance sections are superimposed over each other.

The verification is performed with respect to eight users under this experiment setting. Four out of eight users were instructed in how to use the system previously, and the remaining four users were not instructed in how to use the system. In the verification, each user watched and listened to any two types of scenes in a random order. Herein, each user answered whether or not they correctly understood the content of the conversations, when watching and listening using the information presentation device 20 and when using the normal moving image reproducing device instead of using the information presentation device 20.

Next, the verification result will be described.

FIG. 19 is a view showing an example of percentages of correct answers for each user.

In FIG. 19, the vertical axis indicates the percentages of the correct answers and the horizontal axis indicates users and sets of the users.

The horizontal axis indicates NP1, NP2, NP3, NP4, P1, P2, P3, P4, average of NP, average of P, and overall average, from left to right. The NP indicates users who are not instructed in how to use the information presentation device 20. The P indicates users who are instructed in how to use the information presentation device 20. The average of NP indicates the average value among NP1 to NP4. The average of P indicates the average value among P1 to P4. The overall average indicates the average value of all users. In addition, the bars with horizontal stripes show the result (non-use) obtained by using the normal moving image reproducing device. The filled bars show the result (use) obtained by using the information presentation device 20 according to the embodiment.

According to this, the percentages of the correct answers of the average of NP are 43% in a case of non-use and 67% in a case of use. The percentages of the correct answers of the average of P are 27% in a case of non-use and 85% in a case of use. The percentages of the correct answers of the average of all the users are 35% in a case of non-use and 76% in a case of use.

This result indicates that the percentages of the correct answers increase by using the information presentation device 20 regardless of being instructed in how to use the device. That is, with the embodiment, the users can easily understand the utterance content by selecting and listening to each sound source in which the directions of the utterances at the same time are different from each other.

As described above, in the embodiments described above, the audio signal is input, the image signal is input, and the image indicated by the image signal is displayed.

Then, in the embodiment, the direction information for each sound source based on the audio signal is estimated, the sound source-classified audio signal for each sound source is separated from the audio signal, an operation input is received, and the coordinate designation information indicating a part of the region of the image is generated. In addition, in the embodiment, the sound source-classified audio signal of the sound sources associated with the coordinate which is included in the region indicated by the coordinate designation information, and which corresponds to the direction information is selected. Accordingly, it is easy to understand the utterance content.

In the embodiments described above, the case where the sound source direction information generated by the sound source localization unit 203 is the azimuth in the horizontal direction for each sound source and the sound source selection unit 212 selects the sound source based on the coordinate value in the horizontal direction corresponding to the sound source direction information, has been described, however, it is not limited thereto, in this embodiment.

In this embodiment, the sound source localization unit 203 may generate sound source direction information indicating an azimuth of a vertical direction for each sound source or an azimuth of a horizontal direction and an azimuth of a vertical direction. In this case, the display information generation unit 207 may generate display information including the patterned image information by considering the coordinate value in the vertical direction corresponding to the sound source direction information. The sound source selection unit 212 selects the sound source by considering the coordinate of the vertical direction corresponding to the sound source direction information.

In the embodiments described above, the display information generation unit 207 has been described with the example of the case of generating the display information including the playback patterned image information, the utterance patterned image information or the text patterned image information for each sound source. Herein, the image display unit 210 displays an image indicated by the playback patterned image information, the utterance patterned image information or the text patterned image information. However, it is not limited thereto in this embodiment.

In this embodiment, when the display information generation unit 207 generates the display information, the inclusion of any one of the playback patterned image information, the utterance patterned image information, and the text patterned image information may be omitted. The image display unit 210 may omit displaying of any one of the playback patterned image information, the utterance patterned image information, and the text patterned image information.

In addition, a part of the robots 10 and 40 and the information presentation devices 20 and 50 of the embodiments described above, for example, the audio encoding unit 1012, the image correction unit 1022, the image encoding unit 1023, the motion control unit 106, the audio decoding unit 202, the sound source localization unit 203, the sound source separation unit 204, the speech detection unit 205, the speech recognition unit 206, the display information generation unit 207, the image decoding unit 208, the display image combining unit 209, the sound source selection unit 212, and the control information generation unit 214 may be realized in a computer. In this case, a program for realizing the control function may be realized by recording it in a computer-readable recording medium, making the computer system read and execute the program recorded in the recording medium. The "computer system" herein is a computer system which is embedded in the robot 10 and 40 or the information presentation devices 20 and 50 and which includes hardware such as peripheral device or the like and an OS. In addition, the "computer-readable recording medium" is a transportable medium such as a flexible disk, a magneto-optical disc, a ROM, a CD-ROM or the like, or a memory device such as a hard disk or the like embedded in the computer system. Further, the "computer-readable recording medium" may include a unit which stores the program dynamically for a short time such as a communication line in a case of transmitting the program through a network such as the Internet or through a communication line such as a phone line, and a unit which stores the program for a given time such as a volatile memory in the inner portion of the computer system which is set as a server or a client in this case. In addition, the program may be the program for realizing a part of the functions described above and also the program for realizing the functions described above by combining with the programs already recorded in the computer system.

In addition, a part of or the entirety robots 10 and 40 and the information presentation devices 20 and 50 of the embodiments described above may be realized as an integrated circuit such as LSI (Large Scale Integration). Each functional block of the robots 10 and 40 and the information presentation devices 20 and 50 may be processed individually, or a part of or the entire functional block may be integrated and processed. In addition, a method of converting into the integrated circuit may be realized by dedicated communication circuit or the typical processor, without being limited to the LSI. When the technique of converting to the integrated circuit is advanced as an alternative to the LSI due to the advances in the technique of the semiconductor, the integrated circuit made by the corresponding technique may be used.

Hereinafter, the embodiments of the present invention has been described in detail with reference to the drawings, however, the detailed configuration is not limited to the above descriptions, and various changes of the design may be performed in the range without departing from the scope of the present invention.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An information presentation device comprising:
a processor;
an image display unit; and
an operation input unit receiving an operation by a user, wherein
the processor is programmed with instructions that, when executed, cause the processor at least to:
receive an audio signal and an image signal;
make the display unit to display an image indicated by the image signal;
estimate direction information for each sound source based on the audio signal;
separate the audio signal to sound-source-classified audio signals for each sound source;
generate coordinate designation information indicating a part of a region of the image based on the operation by the user which is input to the operation input unit; and
select a sound-source-classified audio signal of a sound source associated with a coordinate which is included in a region indicated by the coordinate designation information, and which corresponds to the direction information.

2. The information presentation device according to claim 1, wherein the processor is further programmed with instructions that, when executed, cause the processor at least to:
detect whether or not the sound sources corresponding to the sound-source-classified audio signals that are in an utterance state;

generate display information indicating an utterance state on a coordinate corresponding to the direction information of the sound sources in which the utterance state is detected; and make the display unit to display an image indicated by the display information while being superimposed over the image.

3. The information presentation device according to claim 1, wherein the processor is further programmed with instructions that, when executed, cause the processor at least to:
recognize an utterance content based on the sound-source-classified audio signals;
generate display information indicating the utterance content at a coordinate corresponding to the direction information of the sound sources corresponding to the sound-source-classified audio signal; and
make the display unit to display an image indicated by the display information while being superimposed over the image.

4. An information presentation device, comprising:
a processor; and
an operation input unit receiving an operation by a user, wherein
the processor is programmed with instructions that, when executed, cause the processor at least to:
receive an image signal, direction information for each sound source, and a sound-source-classified audio signal for each sound source;
generate coordinate designation information indicating a part of a region of the image based on the operation by the user which is input to the operation input unit; and
select sound-source-classified audio signal of a sound source associated with a coordinate which is included in a region indicated by the coordinate designation information, and which corresponds to the direction information.

5. An information transmission system comprising:
an information acquisition device; and
an information presentation device,
wherein the information presentation device includes:
a first processor;
an image display unit; and
an operation input unit receiving an operation by a user, wherein
the first processor is programmed with instructions that, when executed, cause the first processor at least to:
receive an audio signal and an image signal;
make the display unit to display an image indicated by the image signal;
estimate direction information for each sound source based on the audio signal;
separate the audio signal to sound-source-classified audio signals for each sound source;
generate coordinate designation information indicating a part of a region of the image based on the operation by the user which is input to the operation input unit; and
select a sound-source-classified audio signal of a sound source associated with a coordinate which is included in a region indicated by the coordinate designation information, and which corresponds to the direction information.

6. The information transmission system according to claim 5,
wherein the information acquisition device is included in a robot, and includes:
a second processor; and an imaging unit capturing an image and outputting an image signal of the image, and
the second processor is programmed with instructions that, when executed, cause the second processor at least to:
acquire position information of the imaging unit;
correct the image signal based on the position information, and
output the image signal to the information presentation device.

7. The image transmission system according to claim 5,
wherein the information acquisition device is included in a robot, and includes:
a second processor; and
an imaging unit capturing an image and outputting an image signal of the image,
the first processor of the information presentation device is programmed with instructions that, when executed, cause the first processor at least to:
generate, when a coordinate according to the direction information of the sound source corresponding to the sound-source-classified audio signal is beyond a display range of the image indicated by the input image signal, display information indicating that the coordinate is beyond the display range; and
generate control information which designates a conversion of an aiming of the imaging unit into a direction of the sound source corresponding to the sound-source classified audio signal, and
the second processor of the information acquisition device is
programmed with instructions that, when executed, cause the second processor at least to:
control the aiming of the imaging unit based on the control information; and
output the image signal to the information acquisition device.

8. An information presentation method of an information presentation device comprising:
a step of inputting an audio signal;
a step of inputting an image signal;
a step of displaying an image indicated by the image signal;
a step of estimating direction information for each sound source based on the audio signal;
a step of separating the audio signal to sound-source-classified audio signals for respective sound sources;
a step of receiving an operation input by a user and generating coordinate designation information indicating a part of a region of the image based on the operation by the user; and
a step of selecting sound-source-classified audio signals of sound sources according to a coordinate included in a region indicated by the coordinate designation information, that is, a coordinate corresponding to the direction information.

9. An information presentation method of an information presentation device comprising:
a step of inputting an image signal;
a step of inputting direction information for each sound source;
a step of receiving sound-source-classified audio signal for each sound source;
a step of receiving an operation input by a user and generating coordinate designation information indicating a part of a region of the image based on the operation by the user; and
a step of selecting sound-source-classified audio signals of sound sources according to a coordinate included in a region indicated by the coordinate designation information, that is, a coordinate corresponding to the direction information.

10. A non-transitory computer-readable storage medium comprising an information presentation program which causes a computer of an information presentation device to execute a process, the process comprising:

inputting an audio signal;
inputting an image signal;
displaying an image indicated by the image signal;
estimating direction information for each sound source based on the audio signal;
separating the audio signal to sound-source-classified audio signals for respective sound source;
receiving an operation input by a user and generating coordinate designation information indicating a part of a region of the image based on the operation by the user; and
selecting sound-source-classified audio signals of sound sources according to a coordinate included in a region indicated by the coordinate designation information, that is, a coordinate corresponding to the direction information.

11. A non-transitory computer-readable storage medium comprising an information presentation program which causes a computer of an information presentation device to execute a process, the process comprising:

inputting an image signal;
inputting direction information for each sound source;
receiving sound-source-classified audio signal for each sound source;
receiving an operation input by a user and generating coordinate designation information indicating a part of a region of the image based on the operation by the user; and
selecting sound-source-classified audio signals of sound sources according to a coordinate included in a region indicated by the coordinate designation information, that is, a coordinate corresponding to the direction information.

* * * * *